US011866994B2

(12) United States Patent
Francoeur et al.

(10) Patent No.: US 11,866,994 B2
(45) Date of Patent: Jan. 9, 2024

(54) ROLLER BLIND ACTUATION MECHANISM, SPOOL HOUSING ASSEMBLY AND CABLE-COVERING TUBE SYSTEM FOR A ROLLER BLIND ACTUATION ASSEMBLY

(71) Applicant: 7912854 CANADA INC., Terrebonne (CA)

(72) Inventors: Alain Francoeur, Sainte-Anne-des-Plaines (CA); Augustin Archambault, Sherbrooke (CA)

(73) Assignee: LG Energy Solution, LTD, Seoul (KR)

( * ) Notice: Subject to any disclaimer, the term of this patent is extended or adjusted under 35 U.S.C. 154(b) by 158 days.

(21) Appl. No.: 17/428,203

(22) PCT Filed: Feb. 4, 2020

(86) PCT No.: PCT/CA2020/050134

§ 371 (c)(1),
(2) Date: Aug. 3, 2021

(87) PCT Pub. No.: WO2020/160651

PCT Pub. Date: Aug. 13, 2020

(65) Prior Publication Data

US 2022/0120136 A1 Apr. 21, 2022

Related U.S. Application Data

(60) Provisional application No. 62/800,718, filed on Feb. 4, 2019.

(51) Int. Cl.
*E06B 9/78* (2006.01)
*E06B 9/42* (2006.01)

(52) U.S. Cl.
CPC .................. *E06B 9/78* (2013.01); *E06B 9/42* (2013.01); *E06B 2009/785* (2013.01)

(58) Field of Classification Search
CPC ......... E06B 9/78; E06B 9/42; E06B 2009/785
See application file for complete search history.

(56) References Cited

U.S. PATENT DOCUMENTS 2,410,549 A 11/1946 Olson
3,181,595 A 5/1965 Pender
(Continued)

FOREIGN PATENT DOCUMENTS

DE 2953496 A1 3/1981
ES 2306866 T3 4/2004
(Continued)

OTHER PUBLICATIONS

Patent Cooperation Treaty; International Search Report cited in PCT/CA2020/050134 dated Apr. 24, 2020; 5 pages.
(Continued)

*Primary Examiner* — Beth A Stephan
(74) *Attorney, Agent, or Firm* — Shumaker, Loop & Kendrick, LLP; Patrick B. Horne

(57) ABSTRACT

The present disclosure concerns cable-covering tube assembly for a roller blind actuation cable, comprising a first cable-covering tube defining a cable-receiving cavity; and at least one tube connector extending at least partially in the cable-receiving cavity and comprising a cable-mounting portion couplable to the free end portion of the roller blind actuation cable; and a coupling portion couplable to the coupling portion of a similar tube connector. It also concerns a cable-covering tube system and a roller blind actuation assembly comprising first and second roller blind-operating systems having each a driving assembly and a unidirectional angular coupler, and a biasing member operatively coupling the driving assemblies and extending between their respective unidirectional angular couplers.

20 Claims, 29 Drawing Sheets

(56) References Cited

U.S. PATENT DOCUMENTS

| | | | |
|---|---|---|---|
| 5,513,687 A | 5/1996 | John et al. | |
| 5,577,543 A | 11/1996 | Jelic | |
| 5,722,478 A | 3/1998 | Claypool et al. | |
| 6,516,860 B1 | 2/2003 | Appel et al. | |
| 8,186,413 B2 | 5/2012 | Fujita et al. | |
| 8,844,605 B2 | 9/2014 | Ng | |
| 9,027,627 B2 | 5/2015 | Muto | |
| 9,121,221 B2 | 9/2015 | Cheng | |
| 9,719,296 B1 * | 8/2017 | Lynch | E06B 9/262 |
| 9,890,583 B2 | 2/2018 | Marocco | |
| 11,142,945 B2 * | 10/2021 | Marocco | F16H 7/18 |
| 2007/0215299 A1 | 9/2007 | Eiselt | |
| 2011/0024065 A1 | 2/2011 | Lin | |
| 2011/0108205 A1 * | 5/2011 | Levin | E06B 9/326<br>160/84.01 |
| 2011/0146429 A1 | 6/2011 | Vestal | |
| 2012/0090795 A1 | 4/2012 | Kirby | |
| 2012/0305200 A1 | 12/2012 | Liu | |
| 2013/0126108 A1 | 5/2013 | Davids et al. | |
| 2014/0262065 A1 | 9/2014 | Faller et al. | |
| 2017/0362890 A1 | 12/2017 | Huang | |
| 2018/0106106 A1 | 4/2018 | Davids et al. | |
| 2018/0112461 A1 | 4/2018 | Holt et al. | |
| 2020/0392786 A1 | 12/2020 | Davids et al. | |

FOREIGN PATENT DOCUMENTS

| | | | |
|---|---|---|---|
| ES | 2306866 | T3 | 11/2008 |
| KR | 20160004077 | U | 11/2016 |
| WO | 2012007094 | A1 | 1/2012 |
| WO | 2012051404 | A1 | 4/2012 |
| WO | 2013005524 | A1 | 1/2013 |

OTHER PUBLICATIONS

Patent Cooperation Treaty; Written Opinion cited in PCT/CA2020/050134 dated Apr. 24, 2020; 4 pages.

* cited by examiner

ROLLER BLIND ACTUATION MECHANISM, SPOOL HOUSING ASSEMBLY AND CABLE-COVERING TUBE SYSTEM FOR A ROLLER BLIND ACTUATION ASSEMBLY

PRIOR APPLICATION

The present application claims priority from U.S. provisional patent application No. 62/800,718, filed on Feb. 4, 2020, and entitled "ROLLER BLIND ACTUATION ASSEMBLY", the disclosure of which being hereby incorporated by reference in its entirety.

TECHNICAL FIELD

The technical field relates to roller blind actuation assemblies for roller blinds, and more particularly to roller blind actuation assemblies comprising one or more roller blind actuation cables.

BACKGROUND

Roller blind actuation assemblies often comprise a flexible element, such as a cord or a cable, that is configured to be pulled down by an operator to either wind or unwind a blind mounted to a roller blind tube. However, such flexible elements are dangerous, since children might get strangled with them. Moreover, such roller blind actuation assemblies usually comprise a spool member around which the flexible element is wrapped or unwrapped, when the roller blind actuation assembly is actuated. Such spool members are usually contained in a spool housing assembly mounted to a wall or a window frame, that is usually hardly reachable. Moreover, such spool members are usually actuated by complex and/or cumbersome roller blind actuation mechanisms that might generate friction forces upon actuation.

In view of the above, there is a need for a roller blind actuation assembly which would be able to overcome or at least minimize some of the above-discussed prior art concerns.

BRIEF SUMMARY

It is therefore an aim of the present invention to address the above-mentioned issues.

According to a general aspect, there is provided a cable-covering tube assembly for a roller blind actuation cable of a roller blind actuation assembly, the roller blind actuation cable being couplable to a roller blind tube and comprising a free end portion, the cable-covering tube assembly comprising a first cable-covering tube defining a cable-receiving cavity; and at least one tube connector extending at least partially in the cable-receiving cavity and comprising: a cable-mounting portion couplable to the free end portion of the roller blind actuation cable; and a coupling portion couplable to the coupling portion of a similar tube connector.

According to another general aspect, there is provided a cable-covering tube system for a roller blind actuation assembly comprising a roller blind actuation mechanism couplable to a roller blind tube and at least one roller blind actuation cable coupled to the roller blind actuation mechanism and comprising a free end portion, the roller blind actuation mechanism being actuated upon traction on said at least one roller blind actuation cable, the cable-covering tube system comprising: at least one cable-covering tube assembly according to the present disclosure couplable to the free end portion; and an actuation mechanism-mounting assembly engageable with the roller blind actuation mechanism, the actuation mechanism-mounting assembly comprising at least one actuation mechanism-mounting sleeve defining a tube-receiving cavity, said at least one cable-covering tube assembly being at least partially engaged in a corresponding one of said at least one tube-receiving cavity.

According to another general aspect, there is provided a roller blind actuation assembly comprising: at least one roller blind actuation cable couplable to a roller blind actuation mechanism and comprising a free end portion; a cable-covering tube system according to the present disclosure, each one of said at least one cable-covering tube assembly being coupled to the free end portion of a respective one of said at least one roller blind actuation cable; and a spool housing assembly defining a spool-receiving cavity and having a lower portion, the spool-receiving cavity being shaped and dimensioned to at least partially contain the roller blind actuation mechanism; wherein the actuation mechanism-mounting assembly is engaged with the lower portion of the spool housing assembly.

According to another general aspect, there is provided a roller blind actuation assembly for a roller blind system comprising a roller blind tube, the roller blind actuation assembly comprising: an actuation shaft having an actuation axis; first and second roller blind actuation cables having each a spool-mounting end portion and a free end portion; a first roller blind-operating system pivotably mounted to the actuation shaft and comprising: a first driving assembly having a first spool member, the spool-mounting end portion of the first roller blind actuation cable being engaged therewith to rotate the first driving assembly about the actuation axis in a first direction when a pulling force is exerted on the free end portion thereof; and a first unidirectional angular coupler selectively couplable to the roller blind tube upon rotation of the first driving assembly about the actuation axis in the first direction; a second roller blind-operating system pivotably mounted to the actuation shaft and comprising: a second driving assembly having a second spool member, the spool-mounting end portion of the second roller blind actuation cable being engaged therewith to rotate the second driving assembly about the actuation axis in a second direction opposed to the first direction when a pulling force is exerted on the free end portion thereof; and a second unidirectional angular coupler selectively couplable to the roller blind tube upon rotation of the second driving assembly about the actuation axis in the second direction; and a biasing member operatively coupling the first and second driving assemblies and extending between the first and second unidirectional angular couplers.

According to another general aspect, there is provided a roller blind actuation assembly for a roller blind system comprising a roller blind tube, the roller blind actuation assembly comprising: an actuation shaft having an actuation axis; first and second roller blind actuation cables having each a spool-mounting end portion and a free end portion; a first roller blind-operating system pivotably mounted to the actuation shaft and comprising: a first driving assembly having a first spool member and a first spool shaft at least partially surrounding the actuation shaft, the spool-mounting end portion of the first roller blind actuation cable being engaged with the first spool member to rotate the first driving assembly about the actuation axis in a first direction when a pulling force is exerted on the free end portion thereof; and a first unidirectional angular coupler selectively couplable to the roller blind tube upon rotation of the first driving assembly about the actuation axis in the first direction; and a second roller blind-operating system pivotably mounted to the actuation shaft and comprising: a second driving assembly having a second spool member at least partially surrounding the first spool shaft, the spool-mounting end portion of the second roller blind actuation cable being engaged with the second spool member to rotate the second driving assembly about the actuation axis in a second direction opposed to the first direction when a pulling force is exerted on the free end portion thereof; and a second unidirectional angular coupler selectively couplable to the roller blind tube upon rotation of the second driving assembly about the actuation axis in the second direction; wherein the first spool shaft and the second spool member are radially spaced apart from each other.

According to another general aspect, there is provided a roller blind actuation assembly couplable to a roller blind tube of a roller blind system to wind or unwind the roller blind system upon actuation of the roller blind actuation assembly. The roller blind actuation assembly comprises an actuator mounting assembly; a flexible element having a first end portion couplable to the roller blind tube, and an opposed second end portion; a telescopic tube assembly defining a flexible element receiving cavity and comprising a mounting end portion engaged to the actuator mounting assembly; at least first and second segments slidably engaged together. The second end portion of the flexible element is engaged to the first segment; and the second end portion of the flexible element is displaced within the flexible element receiving cavity when a pulling force is exerted on the first segment to actuate the roller blind actuation assembly.

According to another general aspect, there is provided a roller blind actuation assembly couplable to a roller blind tube of a roller blind system to wind or unwind the roller blind system upon actuation of the roller blind actuation assembly. The roller blind actuation assembly has a first axis and comprises a flexible element having a first end portion and an opposed second end portion; an actuator mounting assembly with a cable guiding path formed thereon, the cable guiding path extending substantially along the first axis; a spool assembly pivotably mounted to the actuator mounting assembly about the first axis and comprising a cable winding body, the first end portion of the flexible element being engaged thereto and at least partially wound around to rotate the spool assembly about the first axis when a pulling force is exerted on the second end portion of the flexible element; an actuation body selectively couplable to the roller blind tube upon rotation of the spool assembly about the first axis. The cable winding body is axially offset with regards to the second end portion of the flexible element.

According to another general aspect, there is provided a roller blind actuation assembly couplable to a roller blind tube of a roller blind system to wind or unwind the roller blind system upon actuation of the roller blind actuation assembly, the roller blind actuation assembly having a first axis and comprising first and second flexible elements each having a first end portion and an opposed second end portion; an actuator mounting assembly with first and second cable guiding paths formed thereon, the cable guiding paths extending substantially along the first axis; a first spool assembly pivotably mounted to the actuator mounting assembly about the first axis and comprising a first cable winding body, the first end portion of the first flexible element being engaged thereto and at least partially wound around to rotate the first spool assembly about the first axis in a first direction when a pulling force is exerted on the second end portion of the first flexible element; a first actuation body selectively couplable to the roller blind tube upon rotation of the first spool assembly about the first axis. The first cable winding body is axially offset with regards to the second end portion of the first flexible element; and a second spool assembly pivotably mounted to the actuator mounting assembly about the first axis and comprising a second cable winding body, the first end portion of the second flexible element being engaged thereto and at least partially wound around to rotate the second spool assembly about the first axis in a second direction when a pulling force is exerted on the second end portion of the second flexible element; a second actuation body selectively couplable to the roller blind tube upon rotation of the second spool assembly about the first axis. The second cable winding body is axially offset with regards to the second end portion of the second flexible element and the second direction is opposed to the first direction.

According to another general aspect, there is provided a roller blind actuation assembly couplable to a roller blind tube of a roller blind system to wind or unwind the roller blind system upon actuation of the roller blind actuation assembly. The roller blind actuation assembly has a first axis and comprises a flexible element having a first end portion and an opposed second end portion; an actuator mounting assembly; a spool assembly pivotably mounted to the actuator mounting assembly about the first axis and comprising a cable winding body, the first end portion of the flexible element being engaged thereto and at least partially wound around to rotate the spool assembly about the first axis when a pulling force is exerted on the second end portion of the flexible element; and an actuation body selectively couplable to the roller blind tube upon rotation of the spool assembly about the first axis.

According to another general aspect, there is provided a roller blind actuation assembly couplable to a roller blind tube of a roller blind system to wind or unwind the roller blind system upon actuation of the roller blind actuation assembly. The roller blind actuation assembly has a first axis and comprises first and second flexible elements each having a first end portion and an opposed second end portion; an actuator mounting assembly; a first spool assembly pivotably mounted to the actuator mounting assembly about the first axis and comprising a first cable winding body, the first end portion of the first flexible element being engaged thereto and at least partially wound around to rotate the first spool assembly about the first axis in a first direction when a pulling force is exerted on the second end portion of the first flexible element; a first actuation body selectively couplable to the roller blind tube upon rotation of the first spool assembly about the first axis; and a second spool assembly pivotably mounted to the actuator mounting assembly about the first axis and comprising a second cable winding body, the first end portion of the second flexible element being engaged thereto and at least partially wound around to rotate the second spool assembly about the first axis in a second direction when a pulling force is exerted on the second end portion of the second flexible element; a second actuation body selectively couplable to the roller blind tube upon rotation of the second spool assembly about the first axis. The second direction is opposed to the first direction.

According to yet another general aspect, there is provided a roller blind system comprising a roller blind tube defining an actuation assembly receiving cavity; and a roller blind actuation assembly according to the present disclosure at least partially inserted in the actuation assembly receiving cavity.

BRIEF DESCRIPTION OF THE DRAWINGS

FIG. 10AA is an enlarged exploded view of an upper portion of one of the cable-covering tubes engageable into an actuation mechanism-mounting sleeve of the roller blind actuation assembly of FIG. 10A;

DETAILED DESCRIPTION

Figure 1:
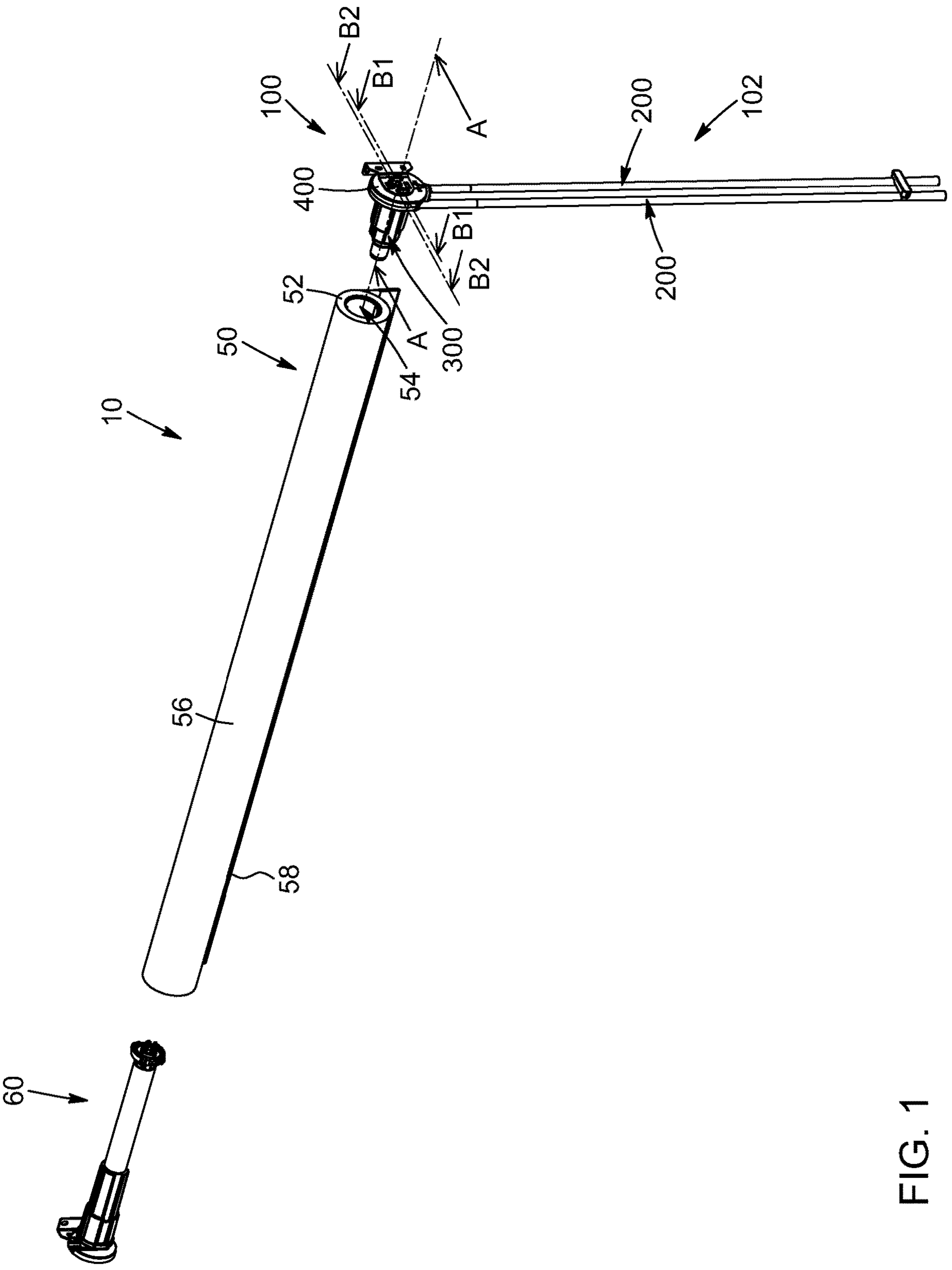
FIG. 1 is a front perspective view, partially exploded, of a roller blind system comprising a roller blind tube assembly and a roller blind actuation assembly in accordance with an embodiment, the roller blind actuation assembly comprising a cable-covering tube system comprising first and second cable-covering tube assemblies, a spool housing assembly and a roller blind actuation mechanism.

In the following description, the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional and are given for exemplification purposes only. Moreover, it will be appreciated that positional descriptions such as "above", "below", "forward", "rearward", "left", "right" and the like should, unless otherwise indicated, be taken in the context of the figures only and should not be considered limiting. Moreover, the figures are meant to be illustrative of certain characteristics of the roller blind actuation assembly and are not necessarily to scale. To provide a more concise description, some of the quantitative expressions given herein may be qualified with the term "about". It is understood that whether the term "about" is used explicitly or not, every quantity given herein is meant to refer to an actual given value, and it is also meant to refer to the approximation to such given value that would reasonably be inferred based on the ordinary skill in the art, including approximations due to the experimental and/or measurement conditions for such given value. In the following description, an embodiment is an example or implementation. The various appearances of "one embodiment", "an embodiment" or "some embodiments" do not necessarily all refer to the same embodiments. Although various features may be described in the context of a single embodiment, the features may also be provided separately or in any suitable combination. Conversely, although the invention may be described herein in the context of separate embodiments for clarity, it may also be implemented in a single embodiment. Reference in the specification to "some embodiments", "an embodiment", "one embodiment" or "other embodiments" means that a particular feature, structure, or characteristic described in connection with the embodiments is included in at least some embodiments, but not necessarily all embodiments. It is to be understood that the phraseology and terminology employed herein is not to be construed as limiting and are for descriptive purpose only. The principles and uses of the teachings of the present disclosure may be better understood with reference to the accompanying description, figures and examples. It is to be understood that the details set forth herein do not construe a limitation to an application of the disclosure. Furthermore, it is to be understood that the disclosure can be carried out or practiced in various ways and that the disclosure can be implemented in embodiments other than the ones outlined in the description above. It is to be understood that the terms "including", "comprising", and grammatical variants thereof do not preclude the addition of one or more components, features, steps, or integers or groups thereof and that the terms are to be construed as specifying components, features, steps or integers. If the specification or claims refer to "an additional" element, that does not preclude there being more than one of the additional element. It is to be understood that where the claims or specification refer to "a" or "an" element, such reference is not be construed that there is only one of that element. It is to be understood that where the specification states that a component, feature, structure, or characteristic "may", "might", "can" or "could" be included, that particular component, feature, structure, or characteristic is not required to be included. The descriptions, examples, methods and materials presented in the claims and the specification are not to be construed as limiting but rather as illustrative only. Meanings of technical and scientific terms used herein are to be commonly understood as by one of ordinary skill in the art to which the invention belongs, unless otherwise defined. It will be appreciated that the methods described herein may be performed in the described order, or in any suitable order.

Referring now to the drawings, and more particularly to FIG. 1, there is shown a roller blind system 10 comprising a roller blind tube assembly 50 and a roller blind mechanism 60 (or roller bling tube-supporting assembly 60). The roller blind tube assembly 50 comprises a roller blind tube 52 defining a mechanism-receiving cavity 54. Moreover, a blind 56 (or window covering 56, or shade 56), for instance at least partially made of fabric or of one or more layers of a flexible material, is mounted to the roller blind tube 52 and is wrapped around the roller blind tube 52. The present disclosure is obviously not limited to a blind that would be formed of fabrics but could also comprise a venetian blind or any other element extendable and retractable in a substantially vertical plane. The blind 56 comprises, in the embodiment shown, a weight bar 58 secured to a bottom edge of the blind 56 (or fabric 56) to maintain the blind in a substantially vertical configuration when the blind 56 is in an unwound configuration (or extended configuration), for instance for the blind to at least partially cover a window.

The roller blind system 10 further comprises a roller blind actuation assembly 100 configured to cooperate with the roller blind tube 52 to extend and retract the blind 56. In other words, the roller blind actuation assembly 100 (or roller blind actuator 100) cooperates with the roller blind tube 52 to configure the blind 56 either in the unwound configuration (or extended configuration) wherein the bottom edge (for instance the weight bar 58) is in a lower end position, or in a wound configuration (or retracted configuration), in which the blind 56 is at least partially wrapped around the roller blind tube 52 and wherein the bottom edge is in an upper end position. The roller blind actuation assembly 100 cooperates with the roller blind tube 52 to configure the blind 56 in any intermediate position between the extended and retracted configurations.

In the embodiment shown, the roller blind actuation assembly 100 comprises a cable-covering tube system 102 comprising first and second cable-covering tube assemblies 200 (or first and second actuation rod assemblies 200). The roller blind actuation assembly 100 further comprises a roller blind actuation mechanism 300 and a spool housing assembly 400 at least partially containing the roller blind actuation mechanism 300. The first and second cable-covering tube assemblies 200 are engaged with the spool housing assembly 400. The present disclosure is not limited to a roller blind actuation assembly comprising first and second actuation rod assemblies; the roller blind actuation assembly could for instance comprise any other type of actuators, such as for instance and without being limitative a cord. As detailed below, the roller blind actuation assembly 100 is actuated by cooperating with one of the first and second cable-covering tube assemblies 200 (for instance by pulling thereon).

Cable-Covering Tube System

Figure 9:
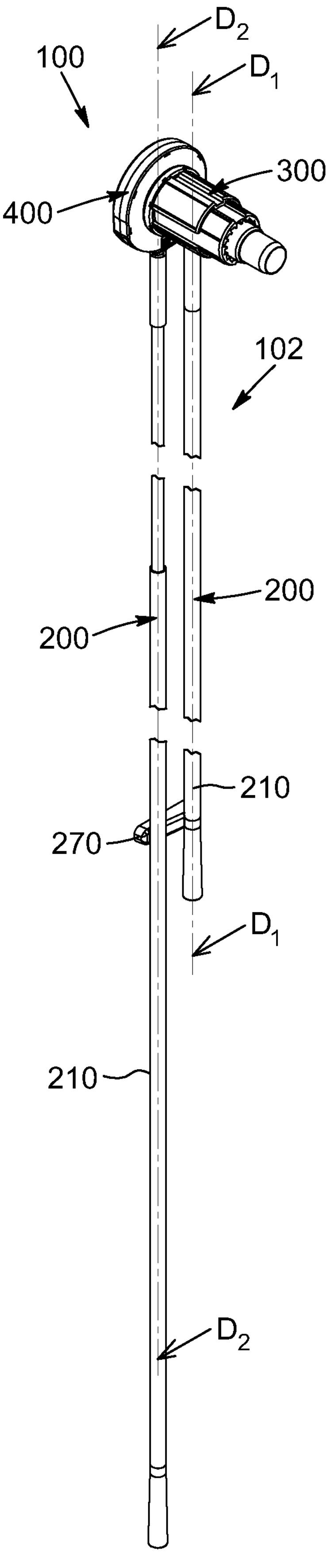
FIG. 9 is a left perspective view of the roller blind actuation assembly of FIG. 1, each of the first and second cable-covering tube assemblies comprising an operating handle, a plurality of cable-covering tubes and tube connectors, the first and second cable-covering tube assemblies being respectively in a retracted configuration and in an actuated configuration.
Figure 10A:
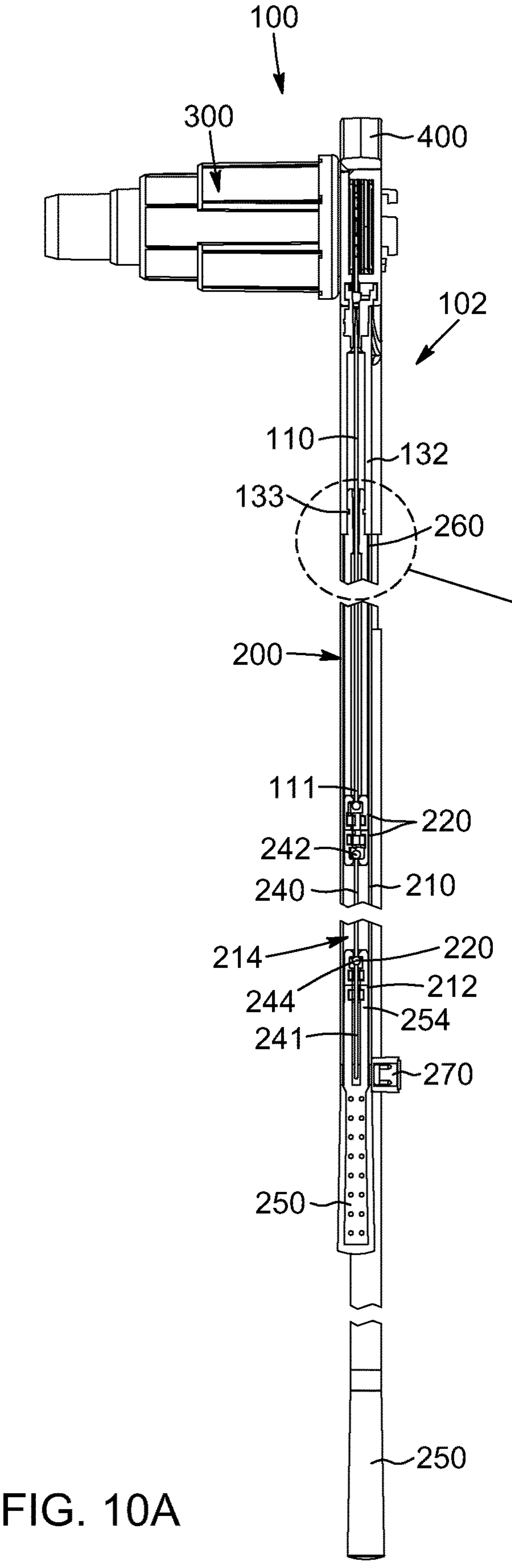
FIG. 10A and FIG. 10B are sectional views taken respectively along cross-section lines D1-D1 and D2-D2 of the roller blind actuation assembly of FIG. 9.
Figure 10A:
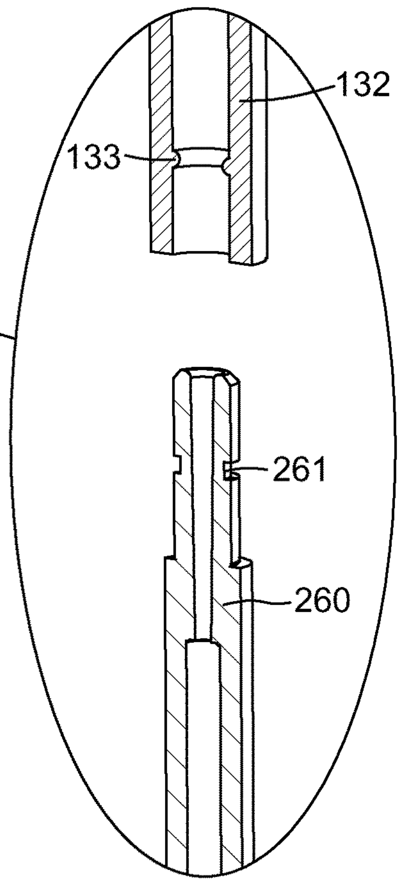
Figure 10B:
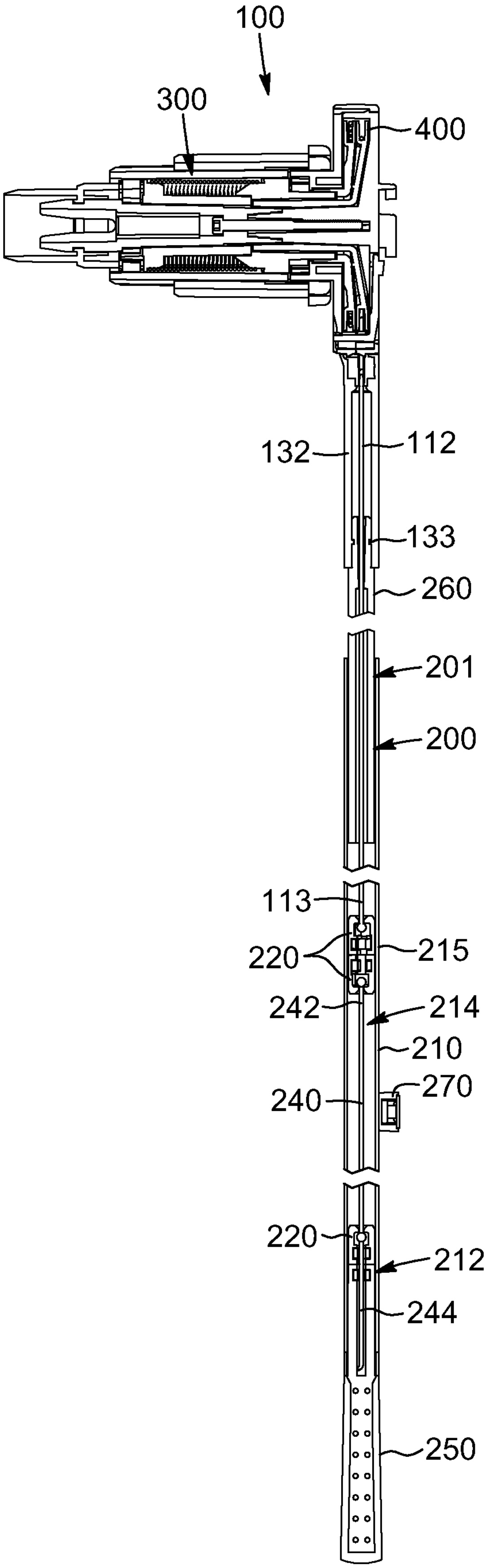

As best shown in FIGS. 10A and 10B, the roller blind actuation assembly 100 comprises first and second roller blind actuation cables 110, 112 (or first and second flexible roller blind-actuating elements 110, 112) operatively coupled to the roller blind tube assembly 50 via the roller blind actuation mechanism 300 to configure the blind 56 from one of the wound and unwound configurations—or any intermediate configuration—into the other one of the wound and unwound configurations—or in any other intermediate configuration—upon pulling on one of the first and second roller blind actuation cables 110, 112. More particularly, each of the first and second roller blind actuation cables 110, 112 comprises a first end portion (or spool-mounting end portion) and an opposed free end portion 111, 113. Referring more particularly to FIGS. 9 to 10B, the first and second cable-covering tube assemblies 200 of the cable-covering tube system 102 are shaped and dimensioned to at least partially cover (or surround, or form a sheath around) respectively the first and second roller blind actuation cables 110, 112 (i.e. to limit an exposure of at least a portion of the first and second roller blind actuation cables 110, 112 upon actuation of the roller blind actuation assembly 100). As detailed below, the cable-covering tube assemblies 200 are configured so that, when configured in an extended configuration (in a partially extended configuration), as represented for instance in FIG. 10B, the roller blind actuation cable is not directly reachable from an outside of the roller blind actuation assembly 100, in order to limit a risk that a user, such as a child or an animal, might get strangled with the roller blind actuation cable.

In the embodiment shown, the first and second cable-covering tube assemblies 200 have a similar shape, so that the following description of one of the cable-covering tube assemblies 200 will apply to any of them.

Cable-Covering Tube Assembly

Referring to FIGS. 9 to 13, in the embodiment shown, the cable-covering tube assembly 200 is configurable into a retracted configuration (FIG. 10A) and an actuated—or above-mentioned extended—configuration. The cable-covering assembly 200 comprises a lower—or first—cable-covering tube 210 defining a cable-receiving cavity 214. For instance, the cable-covering tube 210 is substantially cylindrical but other shapes could be conceived, as long as they allow, as detailed below, a telescopic cooperation with additional cable-covering tubes. The cable-covering tube assembly 200 further comprises a lower tube connector 220 extending at least partially in the cable-receiving cavity 214 at a lower portion 212 of the first cable-covering tube 210.

Figure 12:
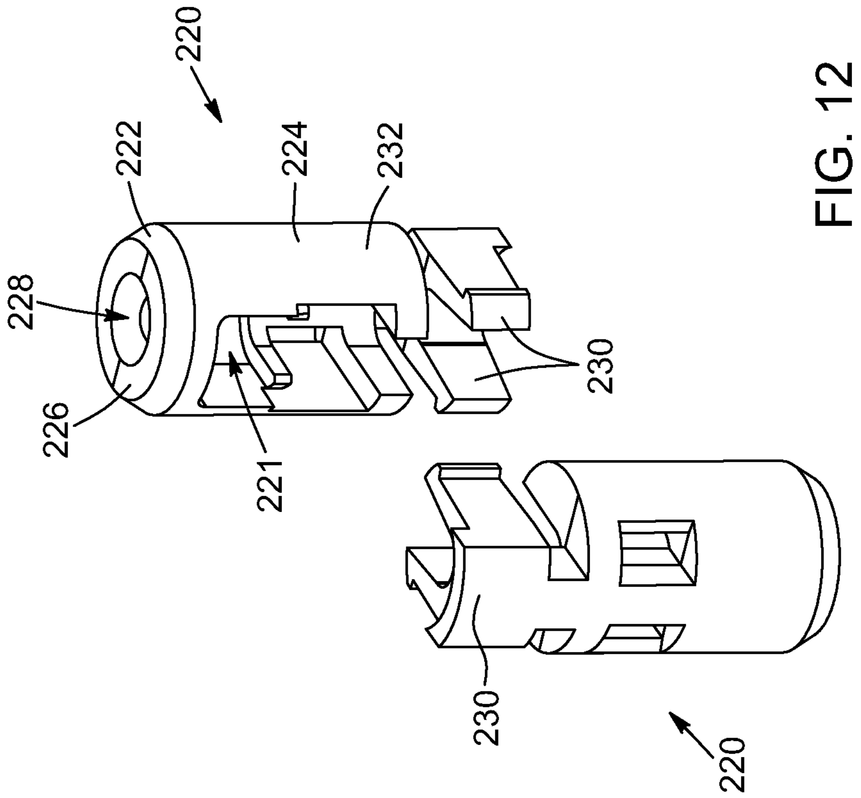
FIG. 12 is a perspective exploded view of the tube connectors of FIG. 11.
Figure 11:
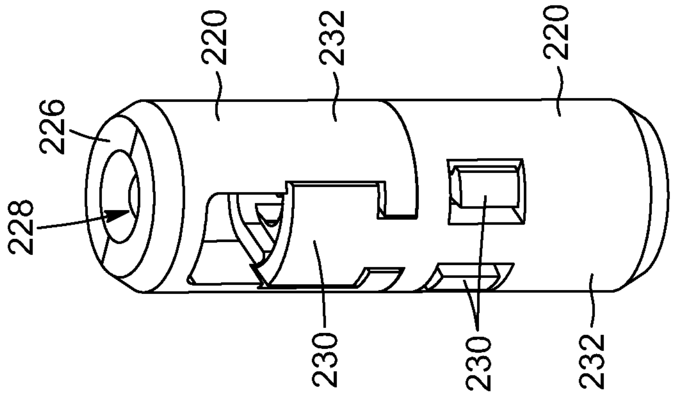
FIG. 11 is a perspective view of tube connectors of FIG. 9 in a connected configuration.

As detailed below, the cable-covering tube assembly 200 comprises a plurality of tube connectors 220 having similar shapes. As best shown in FIGS. 11 and 12, the tube connector 220 has a substantially cylindrical shape. In the embodiment shown, the tube connector 220 has an outer cross-section equal to or smaller than an inner cross-section of the first cable-covering tube 210, so that the tube connector 220 can be at least partially snugly fitted in the cable-receiving cavity 214. The tube connector 220 comprises a cable-mounting portion 222, couplable directly or indirectly to the free end portion 111, 113 of one of the first and second roller blind actuation cables 110, 112. The tube connector 220 further comprises a coupling portion 224 couplable to a similar coupling portion (for instance couplable to the coupling portion of another tube connector 220, as represented in FIG. 11). In the embodiment shown, the tube connector 220 comprises a wall portion 226 extending transversally (for instance substantially perpendicularly to an axis of the tube connector). The cable-mounting portion 222 comprises a cable-receiving aperture 228 (or cable-receiving through opening)—for instance substantially circular—formed in the wall portion 226 and opening into an inner cavity 221 formed in the tube connector 220. As represented in FIGS. 10A and 10B, the cable-receiving aperture 228 is shaped and dimensioned for a flexible element—such as a wire, a cable or a cord—to be engaged into the cable-receiving aperture 228 and to be blocked thereinto, for instance by forming a knot with the flexible element. Any other means could be used to engage the flexible element with the tube connector 220 (with the cable-mounting portion 222 thereof).

The coupling portion 224 comprises a male coupler 230 and a female coupler 232 for instance at least partially formed by the inner cavity 221 of the tube connector 220. The coupling portion 224 is shaped and dimensioned so that the male coupler 230 and the female coupler 232 are couplable respectively with the female coupler 232 and the male coupler 230 of a similar tube connector 220, as represented in FIG. 11. In the embodiment shown, the coupling portion 224 comprises a snap-fit connector (for instance a cantilever snap-fit connector) but other shapes allowing a connection of similar coupling portions could be conceived. When first and second similar tube connectors 220 are coupled to each other, as represented in FIG. 11, the outer cross-section of the assembly of the first and second similar tube connectors 220 is substantially similar to the outer cross-section of each one of the first and second tube connectors 220, so that coupled tube connectors 220 (or connected tube connectors) can be engaged into the cable-receiving cavity 214 of the cable-covering tube 210.

It is appreciated that the shape and the configuration of the tube connector 220, and the shape, the configuration and the location of the cable-mounting portion 222 and the coupling portion 224 thereof can vary from the embodiment shown.

As represented in particular in FIGS. 10A and 10B, the tube connector 220 is shaped and dimensioned to have different possible uses. In the embodiment shown, the cable-covering tube assembly 200 comprises a cable extension 240 having an upper end portion 242 and a lower end portion 244. The tube connector 220 arranged at the lower portion 212 of the first cable-covering tube 210 is firstly configured to be mounted to the lower end portion 244 of the cable extension 240 (for instance by a portion of the cable extension 240 being engaged into the cable-receiving aperture 228 and maintained thereinto via a knot). In the embodiment shown, at least the cable-mounting portion 222 of the lower tube connector 220 extends at least partially in the cable-receiving cavity 214 of the cable-covering tube 210. In the embodiment shown, the cable-covering tube assembly 200 further comprises an operating handle 250 comprising a handling portion 252 and a tube-coupling portion 254 substantially similar to the coupling portion 224 of the tube connector 220. It is thus understood that the coupling portion 254 of the operating handle 250 is couplable to the coupling portion 224 of the lower tube connector 220 (or of any other similar tube connector). In other words, the tube connector 220 arranged at the lower portion 212 of the first cable-covering tube 210 is secondly configured to be mounted to the operating handle 250.

Figure 13:
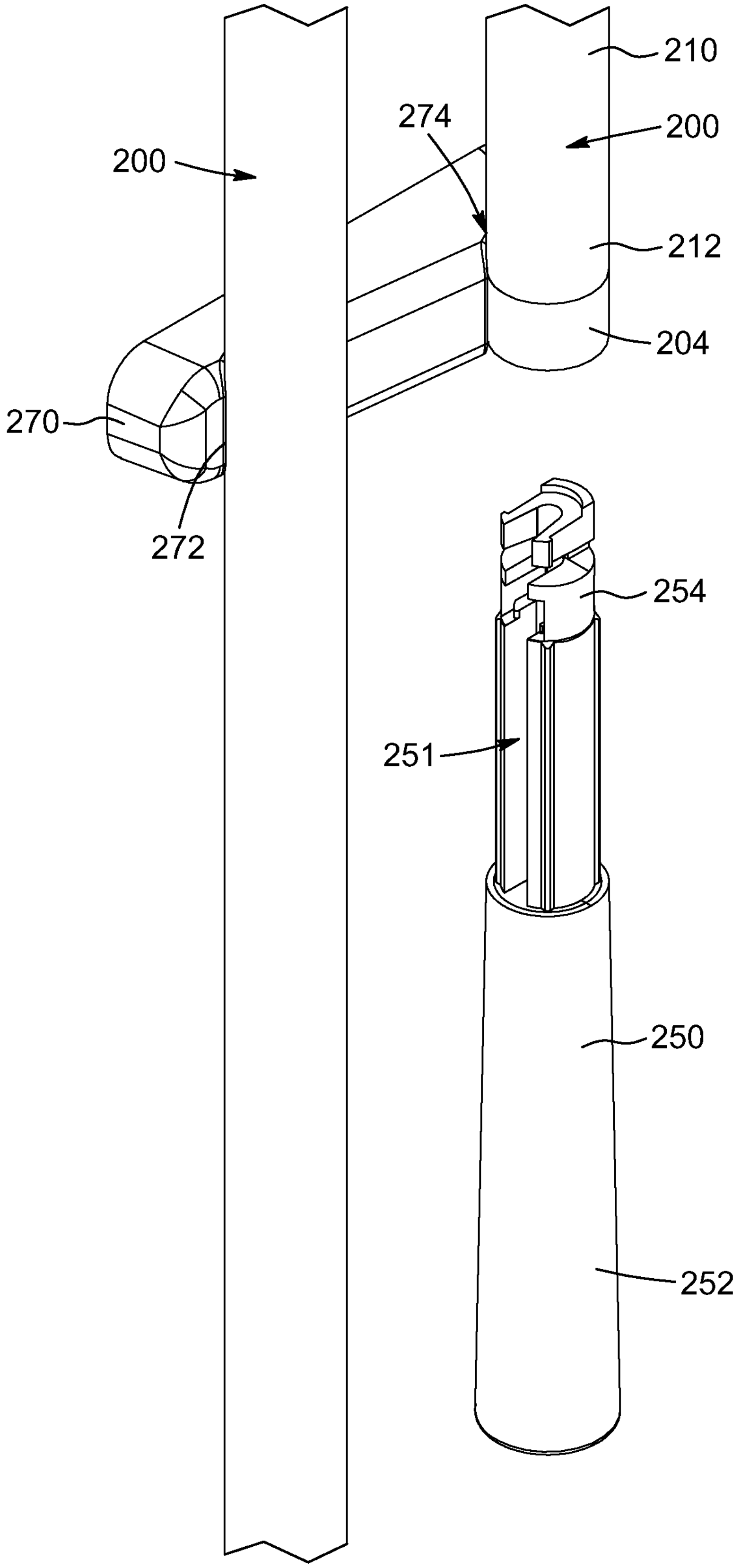
FIG. 13 is a partially exploded view of the operating handle and one of the cable-covering tubes of one of the cable-covering tube assemblies of FIG. 9.
Figure 14:
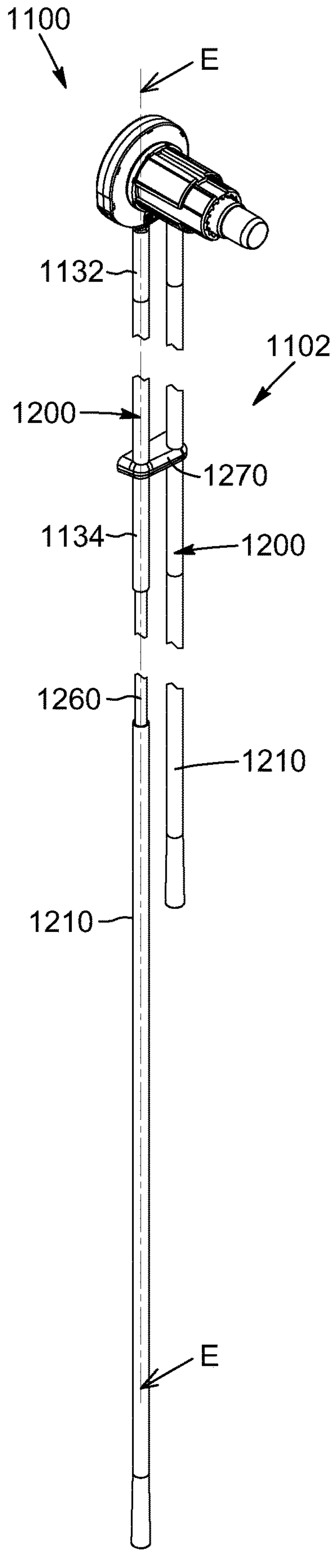
FIG. 14 is a perspective view of a roller blind actuation assembly comprising a cable-covering tube system with first and second cable-covering tube assemblies in accordance with another embodiment.
Figure 15:
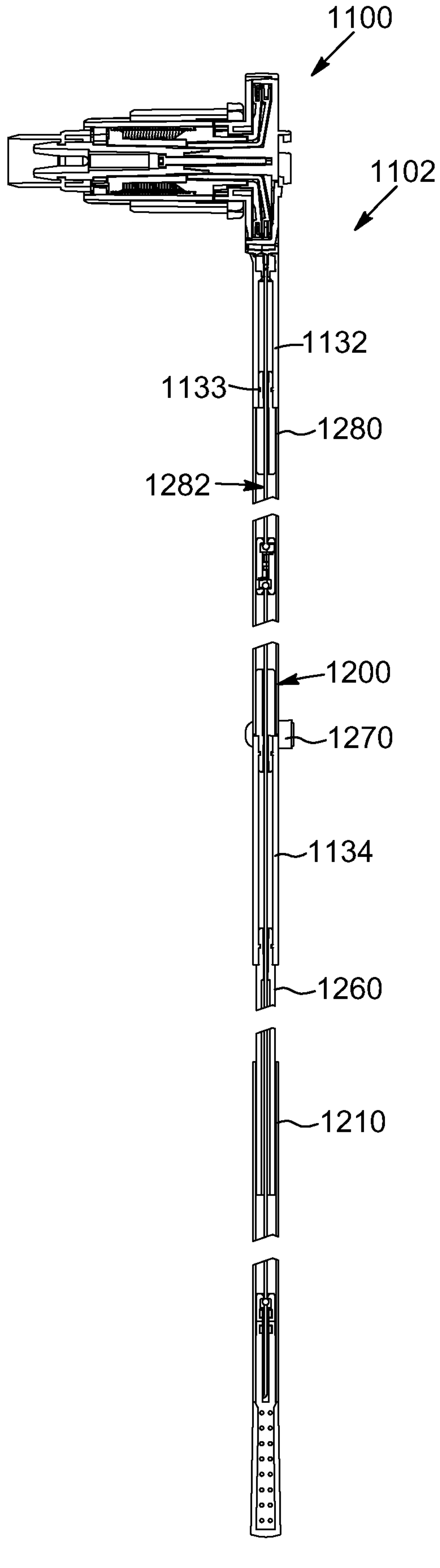
FIG. 15 is a sectional view taken along cross-section lines E-E of one of the roller blind actuation assemblies of FIG. 14.
Figure 17:
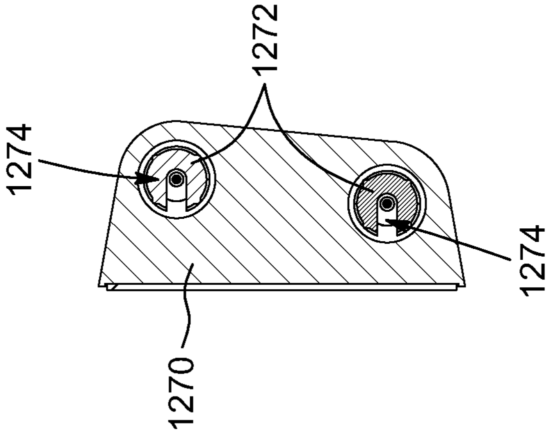
FIG. 17 is a sectional view taken along cross-section lines F-F of the tube-supporting bracket of FIG. 16.
Figure 16:
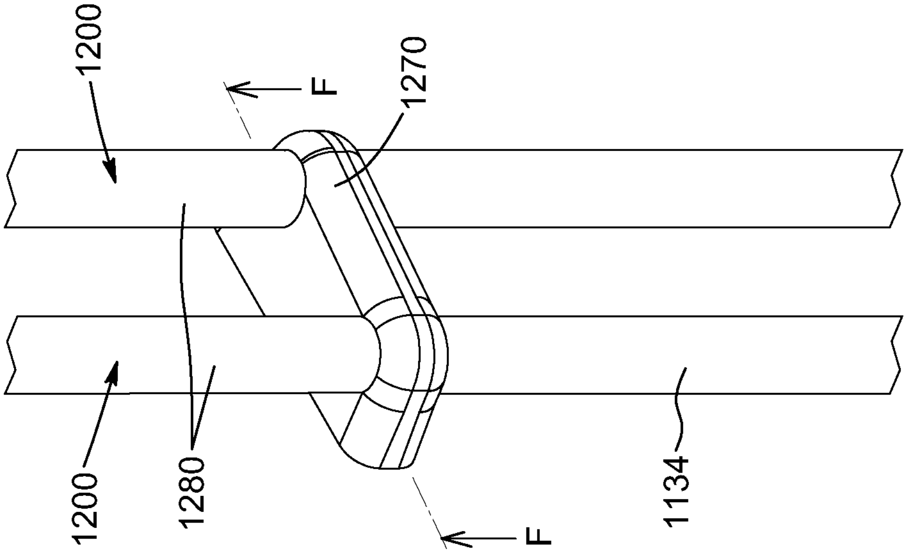
FIG. 16 is an enlarged perspective view of a tube-supporting bracket of one of the cable-covering tube assemblies of FIG. 14.

In the embodiment shown, the handling portion 252 of the operating handle 250 has an outer cross-section greater than an outer cross-section of the lower cable-covering tube 210, for the cable-covering tube assembly 200 to be easily grappable. The handling portion 252 is also shaped and dimensioned to substantially absorb possible noises and impacts in case the cable-covering tube assembly 200 would contact—or bump into—a wall or a window. Moreover, as represented in FIG. 13, a cable-receiving cavity 251 is formed in the operating handle 250 (for instance in the tube-coupling portion 254 thereof). The cable-receiving cavity 251 might be shaped and dimensioned to receive a lower portion 241 (FIG. 10A) of the cable extension 240 extending downwardly from one of the tube connectors 220. The arrangement of a portion of the cable extension 240 in the cable-receiving cavity 251 makes it possible to reach the tube connector 220 and to slide it in the cable-receiving cavity 214 of the first cable-covering tube 210, in order to connect the tube connector 220 with the tube-coupling portion 254 of the operating handle 250.

In the embodiment shown, the cable-covering tube assembly 200 further comprises first and second additional tube connectors 220 (or upper and lower cable extension tube connectors) arranged in the cable-receiving cavity 214 of the cable-covering tube 210 (at a substantially central portion 215 thereof, in the embodiment shown) and connected to each other. The first and second additional tube connectors 220 are respectively mounted to the free end portion 111, 113 of one of the first and second roller blind actuation cables 110, 112, and to the upper end portion 242 of the cable extension 240. In other words, the first and second additional tube connectors 220 connected to each other are shaped and dimensioned to connect together one of the first and second roller blind actuation cables 110, 112 and the cable extension 240. The first and second additional tube connectors 220 forming an interface between the cable extension 240 and one of the first and second roller blind actuation cables 110, 112 could thus be referred to as cable extension tube connectors. It is thus understood that the tube connectors might be couplable directly or indirectly—via one or more cable extensions—to the roller blind actuation cable (to the free end portion thereof). In other words, the cable extension 240 extends at least partially in the cable-receiving cavity 214 of the first cable-covering tube 210 and forms an extension of one of the first and second roller blind actuation cables 110, 112. It could also be conceived cable-covering tube assembly having no cable extension, as detailed below, or more than one cable extension. Moreover, the present disclosure is not limited to tube connectors that would be distinct from the cable-covering tube; it could also be conceived tube connectors that would at least partially be formed integral therewith.

In the embodiment shown, the cable-covering tube assembly 200 further comprises a second cable-covering tube 260 having a cable-receiving cavity 262. For instance, the second cable-covering tube 260 (or upper cable-covering tube 260) has a substantially cylindrical shape and has an outer cross-section smaller than the inner cross-section of the lower cable-covering tube 210 for the first and second cable-covering tubes 210, 260 to be slidably engaged with each other. In other words, the first and second cable-covering tubes 210, 260 form together at least partially a telescopic tube assembly 201. In the embodiment shown, the first cable-covering tube 210 is outwardly slidable with regards to the second cable-covering tube 260 upon traction in a lower direction on the cable-covering tube assembly 200 (for instance upon traction in a substantially lower direction exerted on the operating handle 250). In the embodiment shown, as best shown in FIG. 13, the cable-covering tube system 102 further comprises a tube-supporting bracket 270 mountable to a support structure (for instance a wall or a window frame) and comprising a tube-receiving portion 272 (two tube-receiving portions 272, in the embodiment shown) to receive and/or maintain at least a portion of the cable-covering tube assembly 200 (for instance one of the cable-covering tubes thereof). In the embodiment shown, a tube-receiving recess 274 is formed in the tube-receiving portion 272 that is shaped and dimensioned to at least partially surround an outer portion of the cable-covering tube assembly 200 (for instance an outer portion of the first cable-covering tube 210). In the embodiment shown, the cable-covering tube assembly 200 comprises a metallic portion 204 (for instance arranged between the lower portion 212 of the first cable-covering tube 210 and the operating handle 250) and the tube-receiving portion 272 comprises a magnetic portion to substantially maintain the cable-covering tube assembly 200 against the tube-supporting bracket 270. The metallic and magnetic portions (or metallic and magnetic members) could be inverted or could be arranged differently with respect to the cable-covering assembly 200 and the tube-supporting bracket 270.

It is appreciated that the shape, the configuration of the cable-covering tube assembly 200, and the shape, the configuration, the number and the respective location of the tube connectors 220, the cable-covering tubes 210, 260, the cable extension 240, the operating handle 250 and the tube-supporting bracket 270 of the cable-covering tube system 102 can vary from the embodiment shown.

Referring now to FIGS. 14 to 17, there is shown another possible embodiment of the cable-covering tube system 1102 of the roller blind actuation assembly 1100. The cable-covering tube assembly 1200 further comprises a tube extension 1280 having a substantially cylindrical shape. A cable-receiving cavity 1282 is formed therein which communicates with the cable-receiving cavities of the second cable-covering tube 1260 and the first cable-covering tube 1210. The arrangement of the tube extension 1280 and the first and second cable-covering tubes 1210, 1260 of the cable-covering tube system 1102 is thus adapted for roller blind systems of significant dimensions (for instance of greater dimensions than the above-described cable-covering tube system). The cable-covering tube system 1102 further comprises a tube-supporting bracket 1270 mountable to a support structure (for instance a wall or a window frame) and comprising a tube-receiving portion 1272 (two tube-receiving portions 1272, in the embodiment shown) to receive and/or maintain at least a portion of the cable-covering tube assemblies 1200. In the embodiment shown, the tube-supporting bracket 1270 has tube-receiving openings 1274 formed therein that are shaped and dimensioned to receive (to be engaged with) at least a portion of the cable-covering tube assemblies 1200 (for instance a portion of the tube extension 1280 in the embodiment shown).

Figure 18:
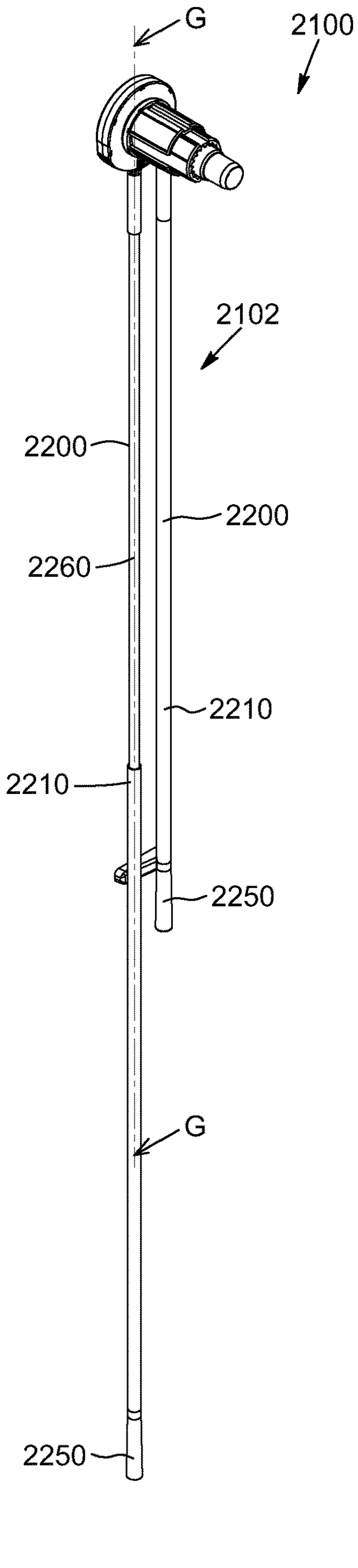
FIG. 18 is a perspective view of a roller blind actuation assembly comprising a cable-covering tube system with first and second cable-covering tube assemblies in accordance with another embodiment.
Figure 19:
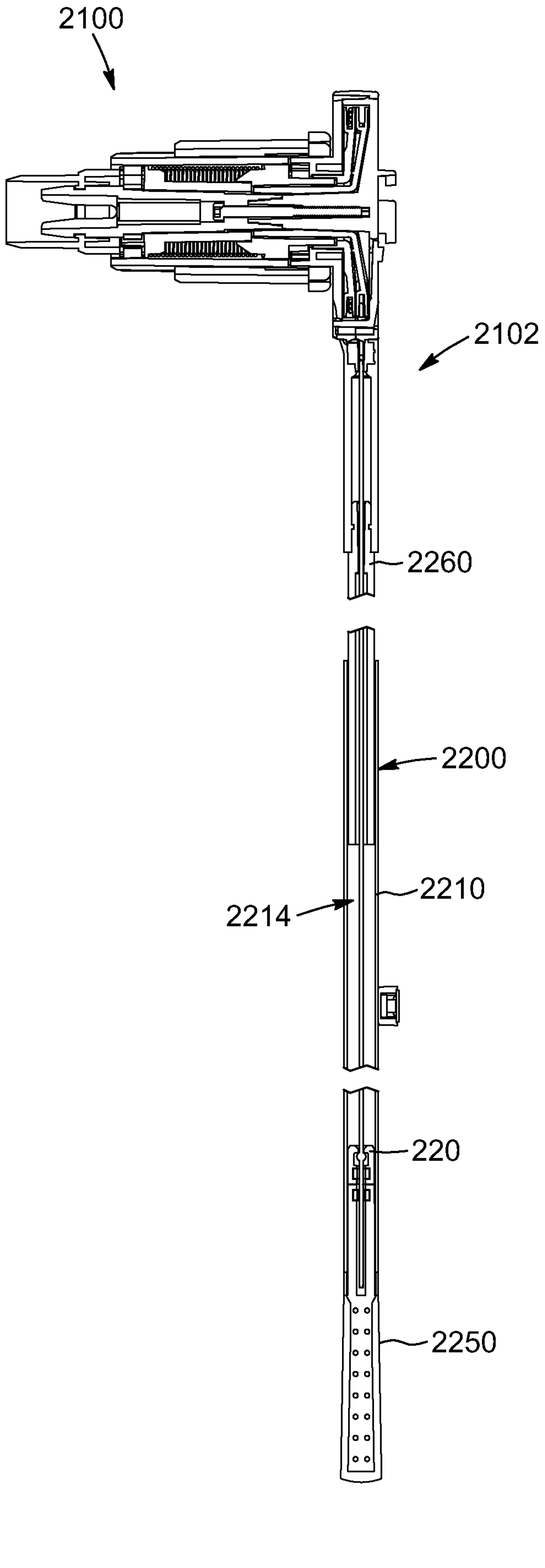
FIG. 19 is a sectional view taken along cross-section lines G-G of one of the roller blind actuation assemblies of FIG. 18.

Referring now to FIGS. 18 and 19, there is shown another possible embodiment of the cable-covering tube system 2102 of the roller blind actuation assembly 2100. The cable-covering tube assembly 2200 comprises first and second cable-covering tubes 2210, 2160. Contrary to the embodiment represented for instance in FIGS. 10A and 10B, the cable-covering tube assembly 2200 does not comprise a cable extension. In the shown embodiment, a single tube connector 220 is arranged in the cable-receiving cavity 2214 of the first cable-covering tube 2210 that is configured to be mounted to the free end portion 111, 113 of one of the first and second roller blind actuation cables 110, 112, and to the operating handle 2250.

Figure 20:
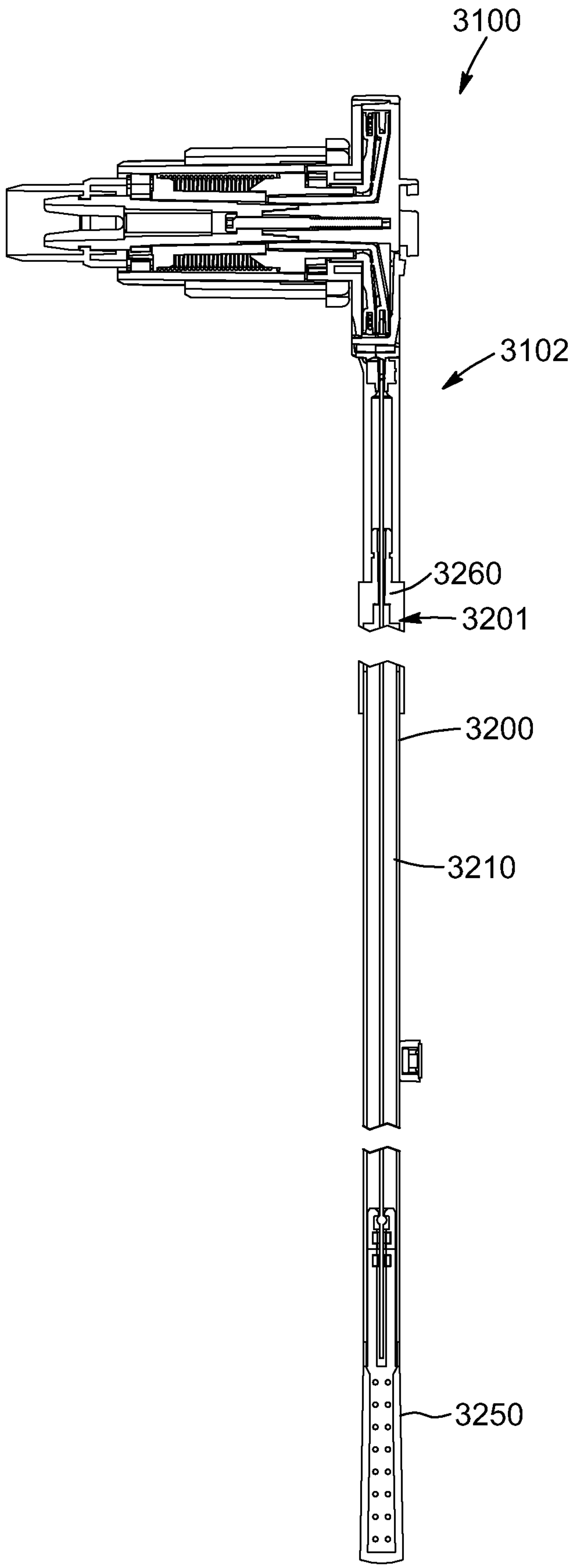
FIG. 20 is a cross-section view of a roller blind actuation assembly comprising a cable-covering tube system in accordance with another embodiment.

The present disclosure is neither limited to the above-described telescopic tube assembly. As represented in FIG. 20, it could be conceived a cable-covering tube system 3102 of a roller blind actuation assembly 3100 comprising a cable-covering tube assembly 3200 with first and second cable-covering tubes 3210, 3260 (or lower and upper cable-covering tubes) forming together at least partially a telescopic tube assembly 3201 wherein the first cable-covering tube 3210 is inwardly slidable with regards to the second cable-covering tube 3260 upon traction in a lower direction on the cable-covering tube assembly 3200 (for instance upon traction in a substantially lower direction exerted on the operating handle 3250). It could also be conceived a telescopic tube assembly having more than two cable-covering tubes slidably mounted to each other.

Figure 21:
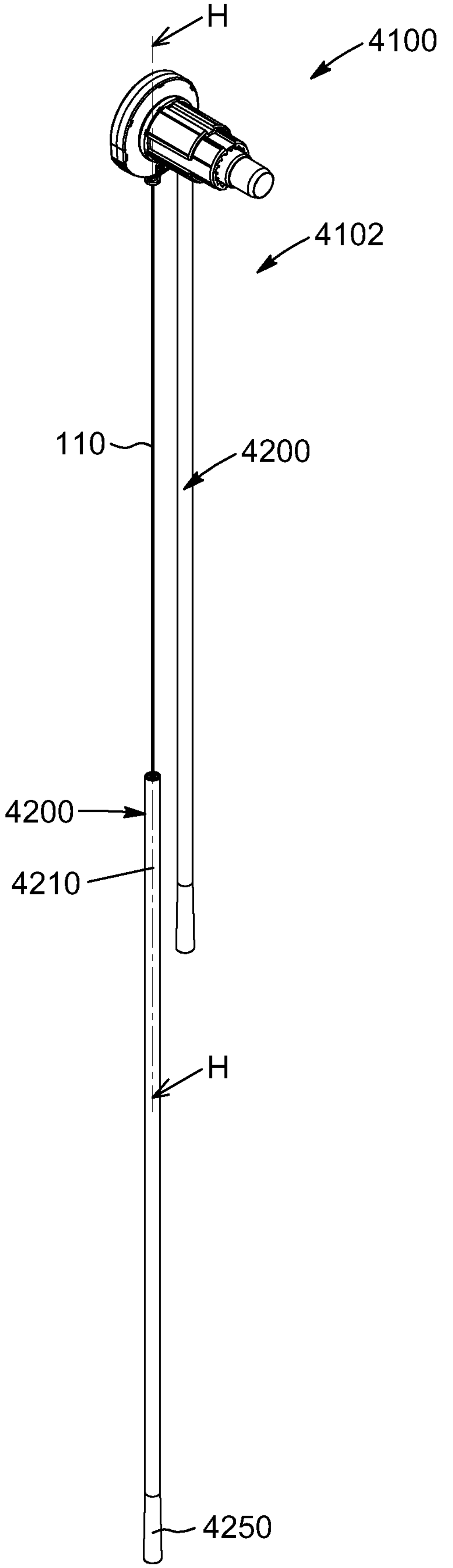
FIG. 21 is a perspective view of a roller blind actuation assembly comprising a cable-covering tube system with first and second cable-covering tube assemblies in accordance with another embodiment.
Figure 22:
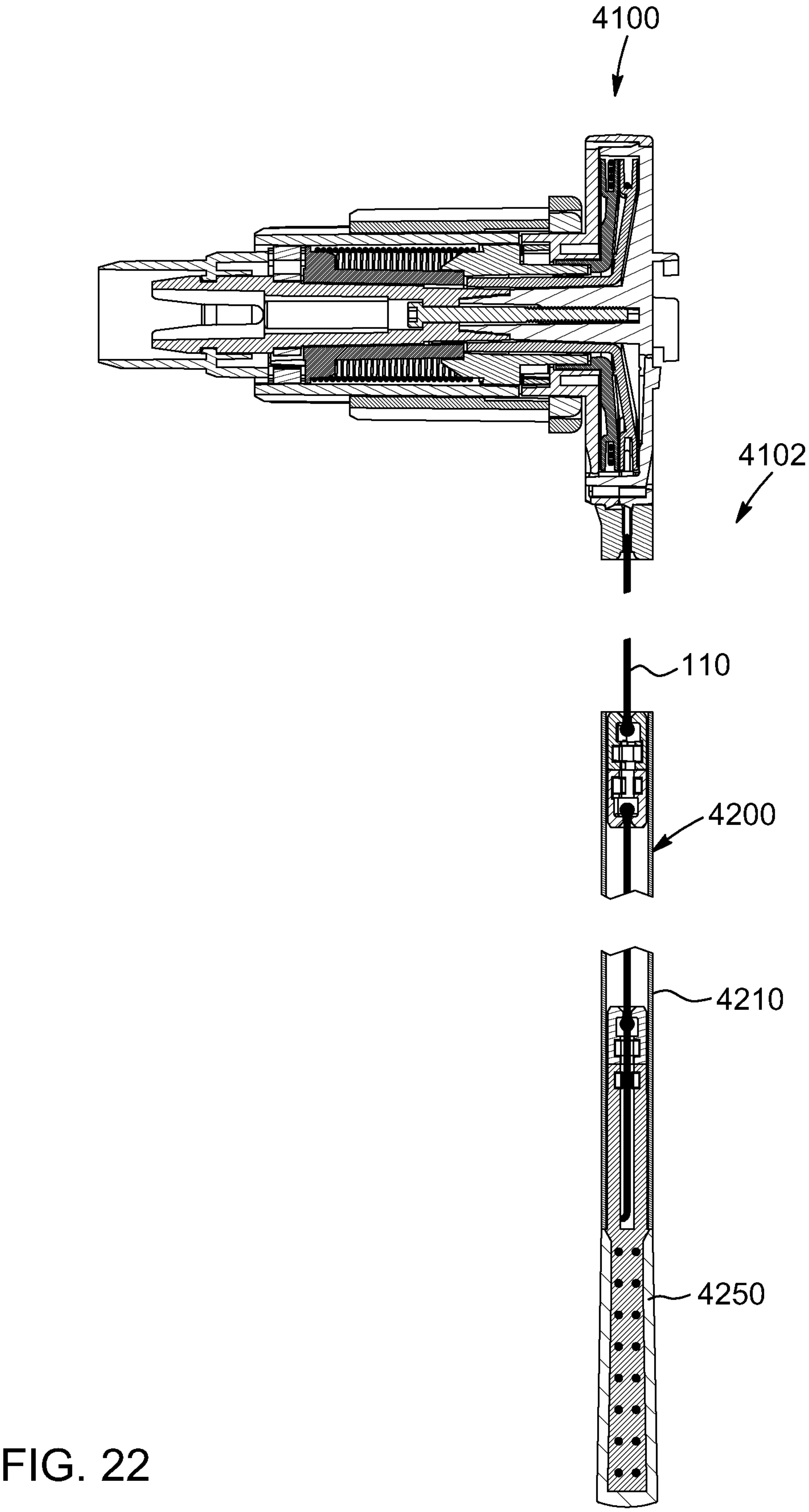
FIG. 22 is a sectional view taken along cross-section lines H-H of one of the roller blind actuation assemblies of FIG. 21.

As represented in FIGS. 21 and 22, it could also be conceived a cable-covering tube assembly 4200 of a cable-covering tube system 4102 of a roller blind actuation assembly 4100 having only a first cable-covering tube 4210.

It is thus understood that the cable-covering tube assembly in accordance with the present disclosure can be adapted and used with roller blind systems of different shapes and dimensions. In particular, the tube connectors are configured to allow the connection of one or more cable-covering tubes and/or one or more cable extensions. In other words, the cable-covering tube assembly in accordance with the present disclosure has a modular construction that allows it to be used with a variety of roller blind systems and/or to easily adapt a length of the cable-covering tube assembly. Moreover, the cable-covering tube assemblies are shaped and dimensioned to cover all or part of the roller blind actuation cables and/or the cable extensions when the roller blind tube assembly is configured in the wound configuration, in the unwound configuration or in any intermediate configuration between the wound and unwound configurations.

Actuation Mechanism-Mounting Assembly

Referring back to FIGS. 2 to 5, the cable-covering tube system 102 further comprises an actuation mechanism-mounting assembly 130 configured to connect the cable-covering tube assembly 200 to the roller blind tube assembly 50 (for instance to connect the cable-covering tube assembly 200 to the roller blind actuation mechanism 300 couplable to the roller blind tube assembly 50). In the embodiment shown, the actuation mechanism-mounting assembly 130 comprises at least one actuation mechanism-mounting sleeve 132 (two in the embodiment shown) defining a tube-receiving cavity 134. The tube-receiving cavity 134 is shaped and dimensioned for the cable-covering tube assembly 200 to be at least partially engaged in the tube-receiving cavity 134. In the embodiment shown, the actuation mechanism-mounting sleeve 132 has a substantially cylindrical shape. More particularly, in the embodiment shown, as represented for instance in FIG. 10A, a tube coupler 133 (for instance a tube-coupling bump) is formed in the tube-receiving cavity 134 of the actuation mechanism-mounting sleeve 132 (i.e. protrudes from an inner surface delimiting the tube-receiving cavity 134). The tube coupler 133 is shaped and dimensioned to cooperate with a sleeve coupler (for instance a coupling groove 261) arranged on an upper portion of the second cable-covering tube 260. It is thus understood that, when the upper portion of the second cable-covering tube 260 is engaged into the tube-receiving cavity 134, the tube coupler 133 is engaged with the sleeve coupler so as to maintain the second cable-covering tube 260 engaged with the actuation mechanism-mounting sleeve 312. Other removable mechanical fasteners could be conceived to removably engage the cable-covering tube assembly 200 (for instance the upper portion of the second cable-covering tube thereof) with the actuation mechanism-mounting assembly 130. Similar—or different—removable mechanical fasteners can be arranged, as represented for instance in FIG. 15, between an upper portion of the tube extension 1280 and the actuation mechanism-mounting sleeve 1132 and/or a lower portion of the tube extension 1280 (proximate the tube-supporting bracket 1270 and for instance extending downwardly thereof) and an upper portion of a flexible tube connection sleeve 1134 (extending between the tube extension 1280 and the second cable-covering tube 1260 and flexibly connecting to each other the first and second cable-covering tubes 1210, 1260) and/or a lower portion of the flexible tube connection sleeve 1134 and an upper portion of the first cable-covering tube 1210 of the roller blind actuation assembly 1100. In other words, in the embodiment shown the tube connection sleeve 1134 is at least partially made of a flexible material, such as an elastomer material, for the first and second cable-covering tubes 1210, 1260 to be tiltable with regards to the tube extension 1280. In the embodiment shown, the connection between the tube extension 1280 and the actuation mechanism-mounting sleeve 1132 is ensured by an interface connecting member 1133 (FIG. 15) extending at least partially in the cable-receiving cavity 1282 of the tube extension 1280 (for instance snugly fitted thereinto) and couplable—for instance via similar removable mechanical fasteners (i.e. a tube-coupling bump cooperating with a coupling groove)—to the actuation mechanism-mounting sleeve 1132. A substantially similar interface connecting member can be arranged between the flexible tube connection sleeve 1134 and the second cable-covering tube 1260.

In the embodiment shown, the actuation mechanism-mounting sleeve 132 is at least partially made of a flexible material, such as an elastomer material, for the cable-covering tube assembly 200 to be tiltable with regards to the spool housing assembly 400 and/or the roller blind actuation mechanism 300. In other words, the actuation mechanism-mounting assembly 130 comprises a flexible actuation mechanism-mounting sleeve 132 allowing the cable-covering tube assembly 200 to be tilted with respect to an actuation mechanism-mounting body 136 of the actuation mechanism-mounting assembly 130. It is thus understood that actuation mechanism-mounting assembly 130, and more particularly the flexible actuation mechanism-mounting sleeve 132 thereof, is designed to allow a pulling force to be exerted on the cable-covering tube assembly 200 in a direction substantially inclined with regards to a vertical direction. In other words, the pulling force applied on the cable-covering tube assembly 200, for instance on the operating handle 250 thereof, can be exerted either along a substantially vertical direction or along an inclined direction. Moreover, the flexible—or tiltable—actuation mechanism-mounting sleeve 132 of the cable-covering tube system 102 further eases the transport and the packaging of the roller blind actuation assembly 100 before its installation to equip a roller blind tube assembly 50. Moreover, the flexible junction—or tiltable junction—between the cable-covering tube system assembly 200 and the roller blind actuation mechanism 300 and/or the spool housing assembly 400 of the roller blind actuation assembly 100 is not limited to a flexible—or tiltable—actuation mechanism-mounting sleeve 132 at least partially made of a flexible material, as in the embodiment shown. A cable-covering tube system comprising a universal joint—or ball joint—or any suitable flexible mechanical fastener could be conceived to flexibly secure an upper end portion of the cable-covering tube assembly to the roller blind actuation mechanism 300 and/or the spool housing assembly 400 of the roller blind actuation assembly 100.

Figure 2:
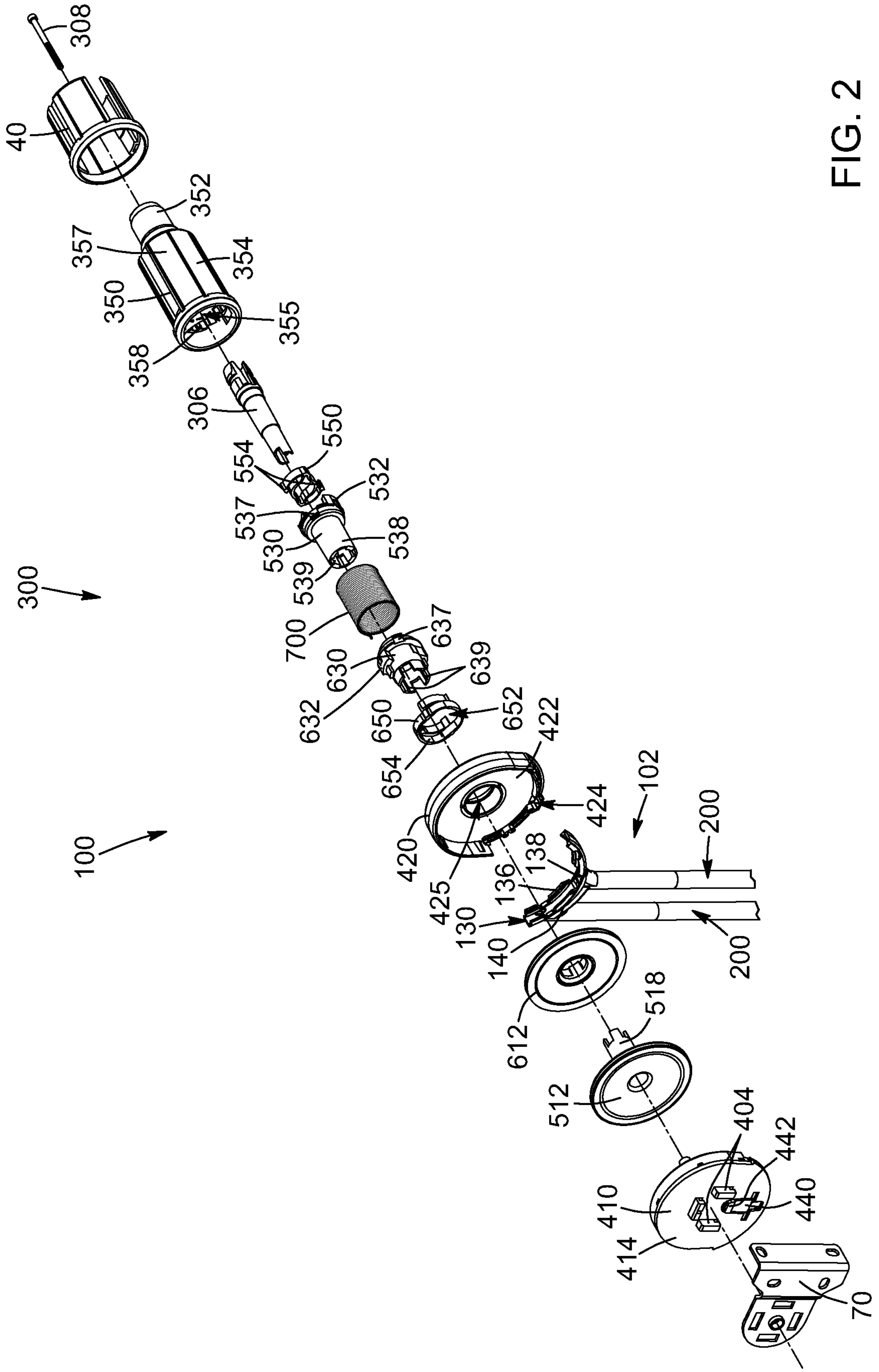
FIG. 2 is a right perspective view, exploded, of an upper portion of the roller blind actuation assembly of FIG. 1.
Figure 3:
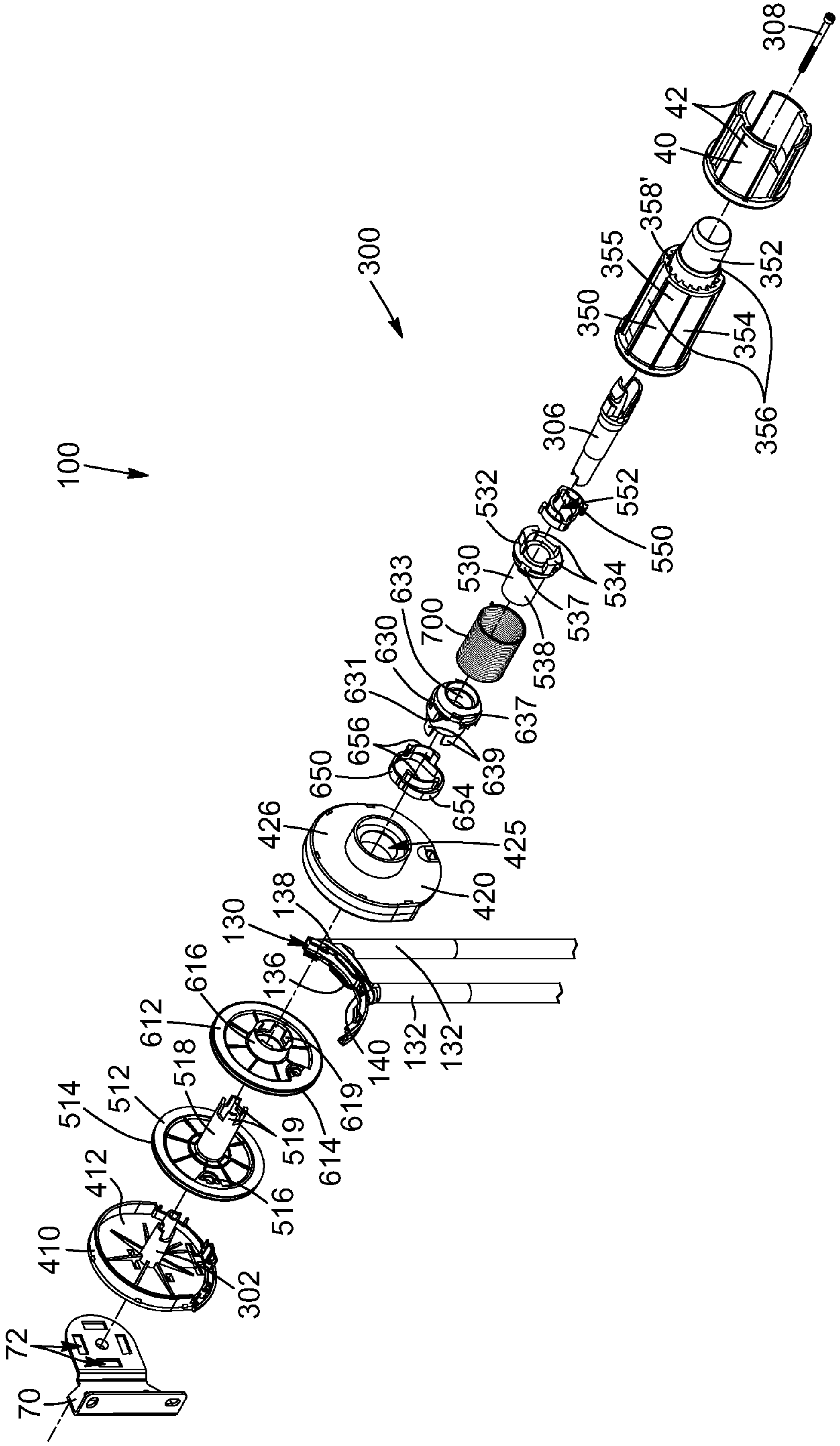
FIG. 3 is a left perspective view, exploded, of the upper portion of the roller blind actuation assembly of FIG. 1.

As represented for instance in FIGS. 2 and 3, the actuation mechanism-mounting assembly 130 is configured to be engageable with the spool housing assembly 400. As detailed below, the spool housing assembly 400 comprises a proximal housing member 410 (with respect to a support structure to which the roller blind actuation assembly 100 is mounted) and a distal housing member 420 at least partially spaced apart from each other and at least partially delimiting in between a spool-receiving cavity 430 (FIG. 8). In the embodiment shown, the actuation mechanism-mounting assembly 130 is at least partially (at least the actuation mechanism-mounting body 136 thereof, in the embodiment shown) engageable in the spool-receiving cavity 430. In the embodiment shown, the actuation mechanism-mounting body 136 is substantially arcuate and comprises a distal side 138 and an opposed proximal side 140. The actuation mechanism-mounting assembly 130 has a plane of symmetry extending between the distal and proximal sides 138, 140. In the embodiment shown, the plane of symmetry is substantially vertical when the actuation mechanism-mounting assembly 130 is engaged with the roller blind actuation mechanism 300. The actuation mechanism-mounting assembly 130 is thus shaped and dimensioned so that the actuation mechanism-mounting assembly 130 can be rotated by a half-turn about a substantially vertical axis for the distal and proximal sides of the actuation mechanism-mounting body 136 to be inverted.

Figure 5A:
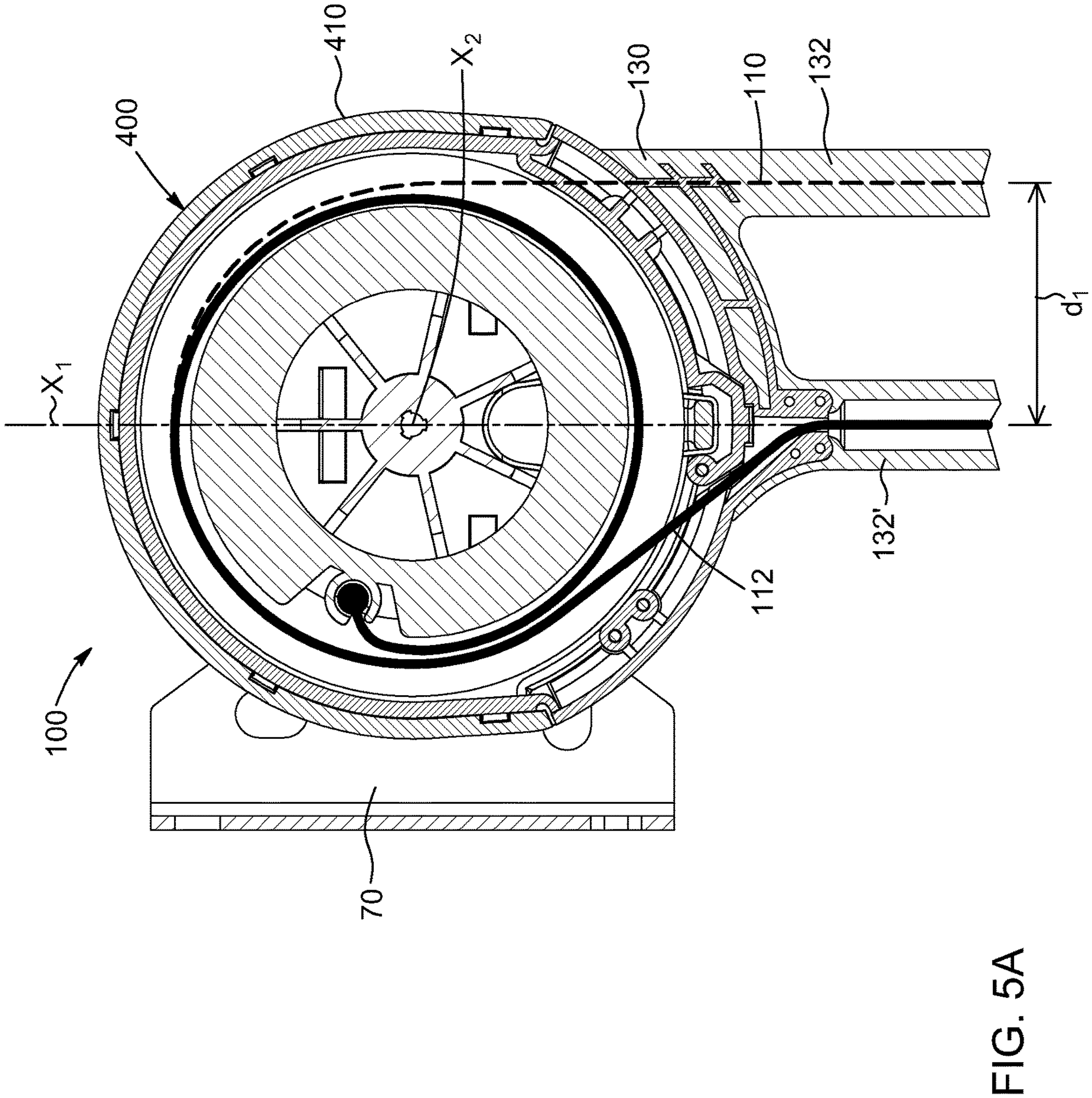
FIGS. 5A and 5B are sectional views taken along respectively cross-section lines B1-B1 and B2-B2 of the upper portion of the roller blind actuation assembly of FIG. 1.
Figure 5B:
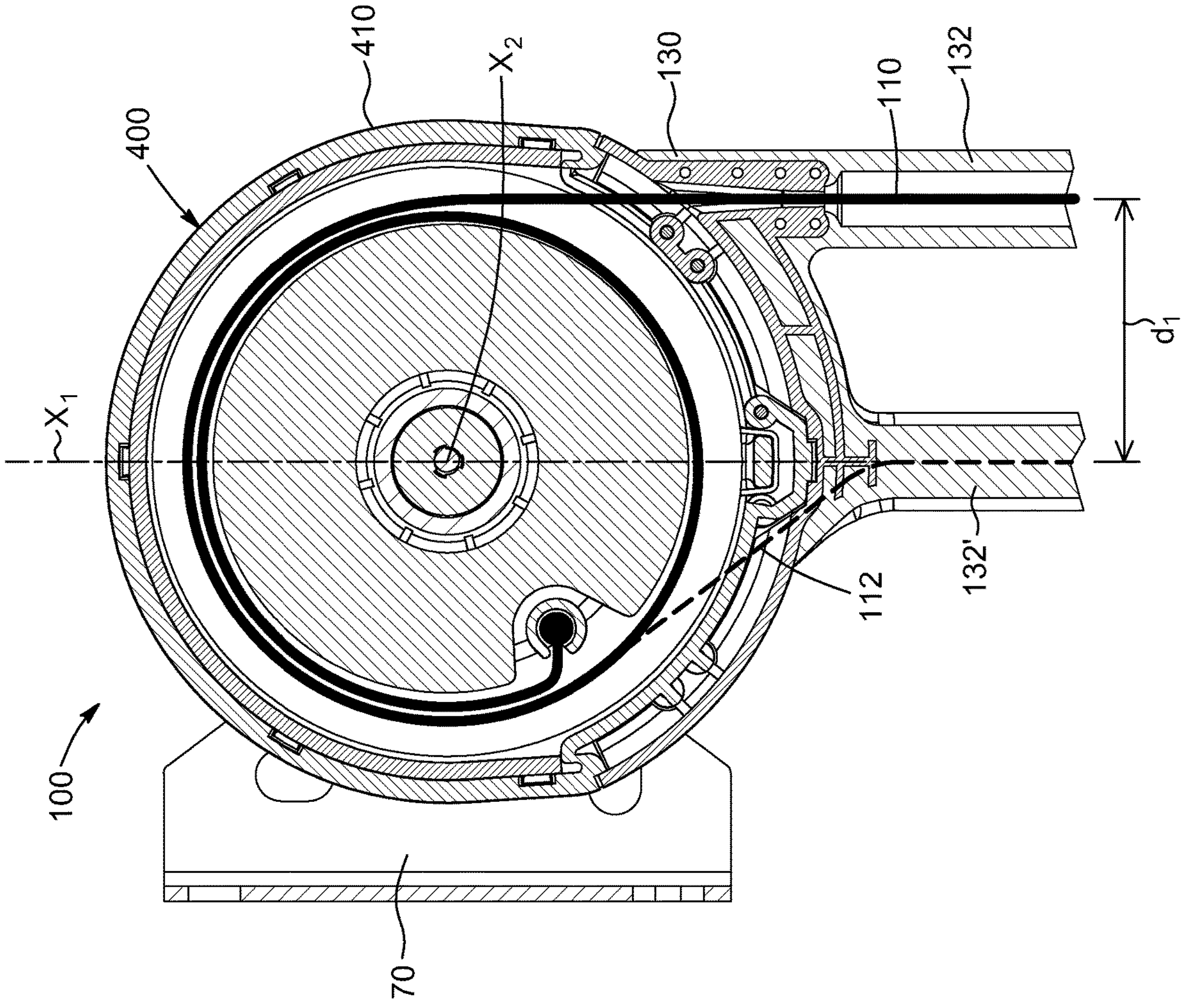
Figure 7:
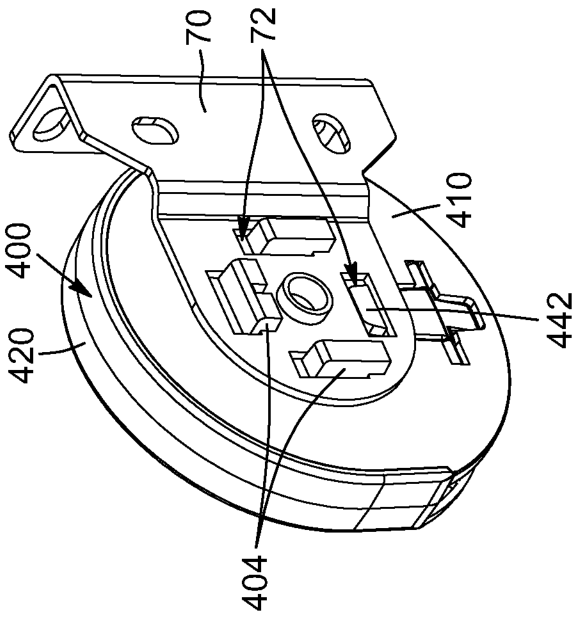
FIG. 7 is a right perspective view of the spool housing assembly of FIG. 6.
Figure 6:
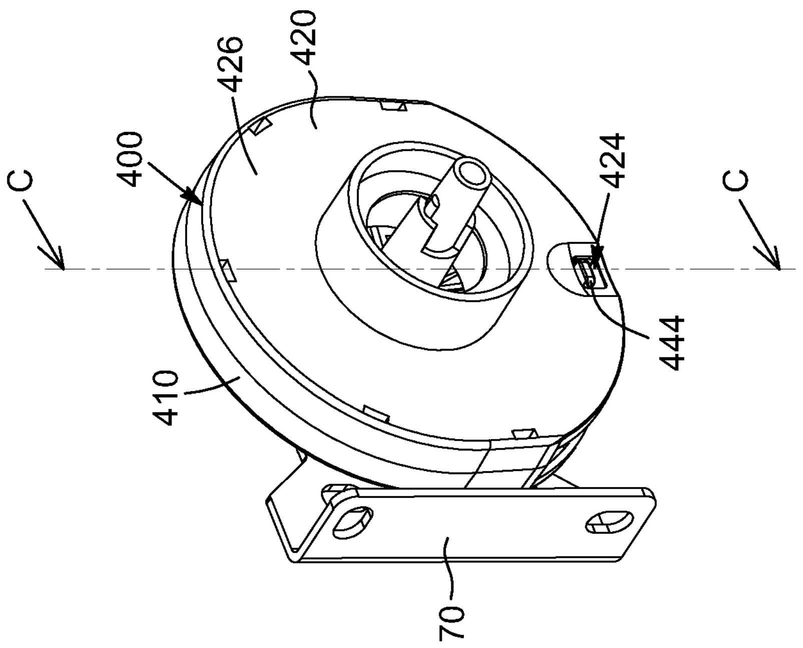
FIG. 6 is a left perspective view of the spool housing assembly of FIG. 1 in a mounting configuration wherein the spool housing assembly is mounted to a roller blind-supporting bracket.

As mentioned above, the actuation mechanism-mounting sleeves 132 are configured to be engaged respectively with the cable-covering tube assemblies 200 connected to the first and second roller blind actuation cable 110, 112 (FIGS. 5A and 5B) (with an upper portion thereof, in the embodiment shown). As best shown in FIGS. 5A and 5B, the actuation mechanism-mounting assembly 130 has a central axis X1. In the embodiment shown, the central axis X1 is substantially vertical when the actuation mechanism-mounting assembly 130 is engaged with the roller blind actuation mechanism 300. A first distance d1 between the central axis X1 and the first actuation mechanism-mounting sleeve 132 is different from a second distance (substantially null, in the embodiment shown) between the central axis X1 and the second actuation mechanism-mounting sleeve 132'. In the embodiment shown, the first and second actuation mechanism-mounting sleeves 132, 132' extend on a same side of the central axis X1. This configuration of the actuation mechanism-mounting assembly 130 thus allows, for instance, the first and second cable-covering tube assemblies 200 to be spaced apart from the blind 56 (for instance to be forwardly arranged with respect to the blind 56) when the roller blind actuation assembly 100 is coupled to the roller blind tube assembly 50, so as to ease the access to the cable-covering tube assemblies 200, and thus to ease the actuation of the roller blind actuation assembly 100. Moreover, the above-mentioned vertical plane of symmetry of the actuation mechanism-mounting assembly 130 allows the roller blind actuation assembly 100 to be installed at a right end portion of the roller blind tube assembly 50, as represented in FIG. 1, or at a left end portion of the roller blind tube assembly 50 (not represented). In other words, the actuation mechanism-mounting assembly 130 also contributes to the modularity of the roller blind actuation assembly 100.

It is appreciated that the shape, the configuration, and the location of the actuation mechanism-mounting assembly 130 (for instance with respect to the spool housing assembly 400), as well as the shape, the configuration, the location and/or the number of the actuation mechanism-mounting body and the actuation mechanism-mounting sleeves thereof can vary from the embodiment shown.

Spool Housing Assembly

As mentioned above, and as best shown in FIGS. 4 to 8, the roller blind actuation assembly 100 comprises the spool housing assembly 400 which is shaped and dimensioned to contain at least partially the roller blind actuation mechanism 300. The spool housing assembly 400 comprises the proximal housing member 410 (with respect to a support structure to which the roller blind actuation assembly 100 is mounted) and the distal housing member 420 at least spaced apart from each other and at least partially delimiting in between the spool-receiving cavity 430. More particularly and as further detailed below, in the embodiment shown, the roller blind actuation mechanism 300 comprises first and second roller blind operating systems 500, 600 having respectively first and second driving assemblies 510, 610 with a spool member 512, 612 (or cable-winding member). The spool-receiving cavity 430 is shaped and dimensioned to contain at least partially the first and second driving assemblies 510, 610, for instance to at least partially contain the spool members 512, 612 of the first and second driving assemblies 510, 610. In the embodiment shown, as mentioned above, the actuation mechanism-mounting body 136 of the actuation mechanism-mounting assembly 130 is at least partially engageable in the spool-receiving cavity 430 and the actuation mechanism-mounting assembly is at least partially engageable with the spool housing assembly 400 at a lower portion 402 thereof (for instance engageable with a lower portion of at least one of the proximal and distal housing members 410, 420). The distal housing member 420 is removably couplable to the proximal housing member 410, for instance via mechanical fasteners arranged on an inner face 422 of the distal housing member 420 and an inner face 412 of the proximal housing member 410 (with respect to the spool-receiving cavity 430). In the embodiment shown, pins protrude from the inner face 412 of the proximal housing member 410 that are engageable with apertures formed in the inner face 422 of the distal housing member 420, but any other removable mechanical fasteners could be conceived.

Figure 8A:
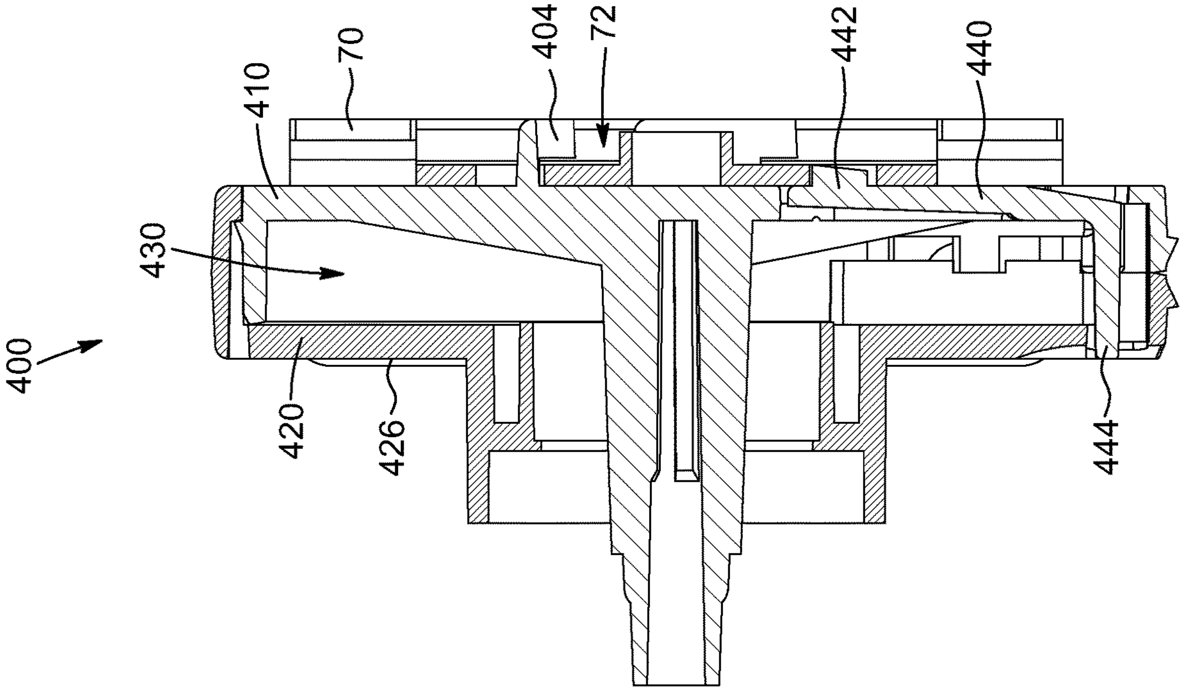
FIG. 8A is sectional view taken along cross-section lines C-C of the spool housing assembly of FIG. 6, the spool housing assembly comprising a support-mounting member in the mounting configuration.
Figure 8B:
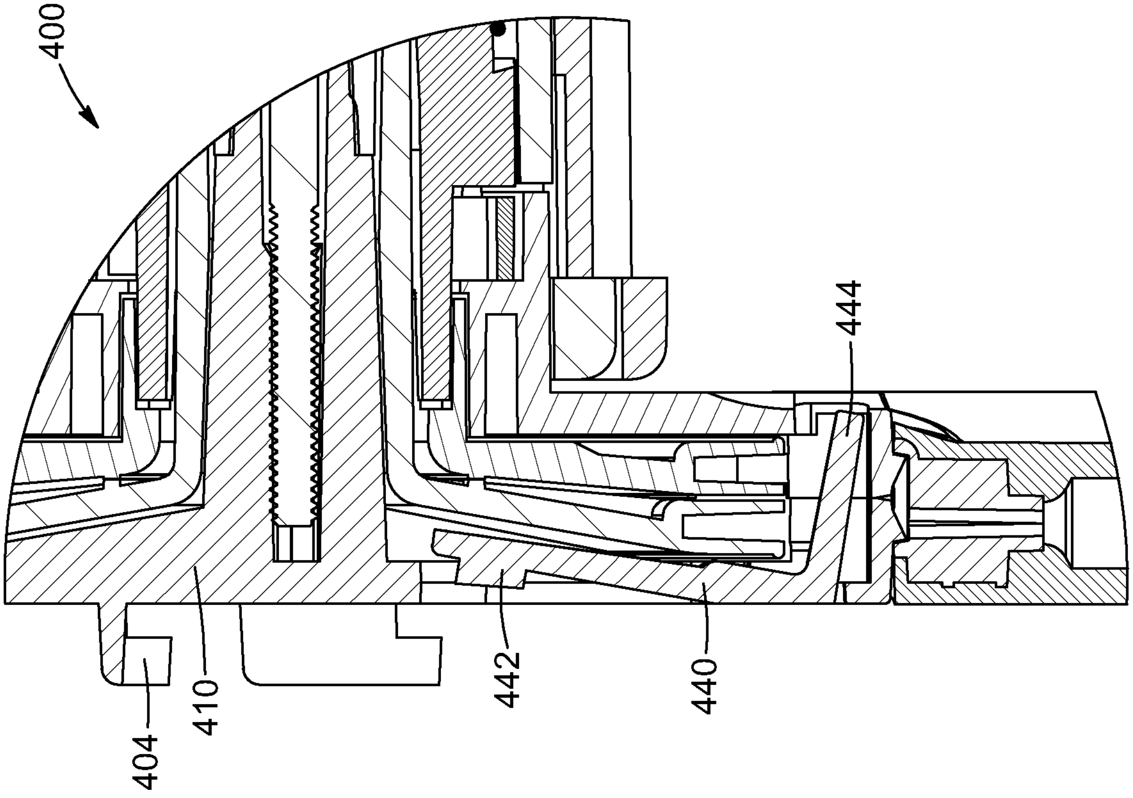
FIG. 8B is a cross-section view of the spool housing assembly of FIG. 6, the support-mounting member being in a removal configuration.

In the embodiment shown, the spool housing assembly 400 comprises a displaceable (or mobile) support-mounting member 440 configurable into a mounting configuration, as represented in FIG. 8A, wherein the spool housing assembly 400 is engaged with a roller blind-supporting bracket 70 having tab-receiving openings 72 formed therein, and into a removal configuration wherein the spool housing assembly 400 is disengaged from the roller blind-supporting bracket 70, as represented in FIG. 8B. In the embodiment shown, the support-mounting member 440 comprises a support-mounting portion 442 protruding from an outer face 414 of the proximal housing member 410, and an actuation portion 444. The actuation portion 444 is engageable into an actuator-receiving aperture 424 that is formed in the distal housing member 420 and is displaceable therein so as to configure the support-mounting member 440 from the mounting configuration into the removal configuration upon applying pressure thereon. In other words, the actuation portion 444 is displaceable between a locked configuration—FIG. 8A—wherein the support-mounting member 440 is configured into the mounting configuration, and an unlocked configuration—FIG. 8B—wherein the support-mounting member 440 is configured into the removal configuration. In the embodiment shown, the support-mounting member 440 has a substantially L shape and has a first portion comprising the support-mounting portion 442 and extending substantially vertically in the spool-receiving cavity 430 when configured in the mounting configuration. The support-mounting member 440 further comprises a second portion comprising the actuation portion 444 and extending substantially horizontally in the spool-receiving cavity 430 when configured into the mounting configuration. In the embodiment shown, the actuator-receiving aperture 424 is a through opening formed in the distal housing member 420 so that the actuation portion 444 is reachable from an outer face 426 of the distal housing member 420. It is thus understood that the actuation portion 444 is easily reachable for the spool housing assembly 400 to be easily configured from the mounting configuration into the removal configuration, without any specific tool.

In the embodiment shown, the spool housing assembly 400 further comprises bracket-mounting portions 404 (comprising three bracket-mounting tongues 404 or support-mounting tabs 404) protruding from the outer face 414 of the proximal housing member 410 and engageable into corresponding tab-receiving openings 72 of the roller blind-supporting bracket 70. It is understood that the support-mounting member 440 (for instance the support-mounting portion 442 thereof) is configured to maintain the bracket-mounting portions 404 engaged into the corresponding tab-receiving openings 72: in case a user would push upwardly onto one of the above-described cable-covering tube assemblies 200, the engagement of the support-mounting portion 442 with the roller blind-supporting bracket 70 would limit the risk that the bracket-mounting portions 404 are disengaged from the corresponding tab-receiving openings 72 (i.e. to limit the risk that the spool housing assembly 400 is accidentally disengaged from the roller blind-supporting bracket 70).

It is appreciated that the shape, the configuration, and/or the location of the spool housing assembly, as well as the shape, the configuration and/or the location of the proximal housing member, the distal housing member and the support-mounting member thereof can vary from the embodiment shown.

Roller Blind Actuation Mechanism

Referring now to FIGS. 2 to 4 and 23 to 26, there is shown the roller blind actuation mechanism 300 of the roller blind actuation assembly 100. The roller blind actuation mechanism 300 comprises an actuation shaft 302 having an actuation axis X2. As mentioned above, the roller blind actuation mechanism 300 comprises the first and second roller blind operating systems 500, 600 being pivotably mounted to the actuation shaft 302 and having respectively the first and second driving assemblies 510, 610 with the spool member 512, 612 (or cable-winding member). The first end portions (or spool-mounting end portion) of the first and second roller blind actuation cables 110, 112 are engaged respectively with the spool member 512, 612 of the first and second driving assemblies 510, 610. The first and second driving assemblies 510, 610 are pivotable about the actuation axis X2 in opposed first and second directions upon actuation of the roller blind actuation mechanism 300 (i.e. upon exerting a pulling force on the free end portion 111, 113 of the first and second roller blind actuation cables 110, 112, for instance via the above-described cable-covering tube assemblies 200). The roller blind actuation mechanism 300 further comprises first and second unidirectional angular couplers 550, 650 (or first and second blind-engaging members 550, 560) selectively couplable to the roller blind tube 52 upon rotation of the first and second driving assemblies 510, 610 in the corresponding one of the first and second directions. It is thus understood that, as further described below, the first and second driving assemblies 510, 610 substantially extend in the inner cavity of the roller blind tube 52 of the roller blind tube assembly 50 and cooperate respectively with the first and second unidirectional angular couplers 550, 650 to rotate the roller blind tube 52 about the actuation axis X2 in one of the first and second directions corresponding respectively to one of winding and unwinding directions.

Actuator-Mounting Assembly

In the embodiment shown, the roller blind actuation assembly 100 is securable to a supporting surface, such as a wall, a window frame, a door frame or any other convenient supporting structure, via the above-described spool housing assembly 400. The outer face 414 of the proximal housing member 410 forms a bracket-mounting face of the roller blind actuation assembly 100. In the embodiment shown, the actuation shaft 302 protrudes from the inner face 412 of the proximal housing member 410. The actuation shaft 302 has a substantially cylindrical shape extending along the actuation axis X2. More particularly, in the embodiment shown, the actuation shaft 302 comprises a proximal shaft portion 304 protruding from the inner face 412 of the proximal housing member 410, and a distal shaft portion 306 (or bearing sleeve-mounting shaft portion 306). In the embodiment shown, the proximal and distal shaft portions 304, 306 are two distinct elements secured to each other via a shaft-fastening member 308 (a screw, in the embodiment shown) but other embodiments of the actuation shaft (for instance formed of one single component or of more than two components) could be conceived.

It is appreciated that the shape, the configuration, and/or the location of the actuation shaft 302 can vary from the embodiment shown.

First Driving Assembly—First Spool Assembly

Figure 4:
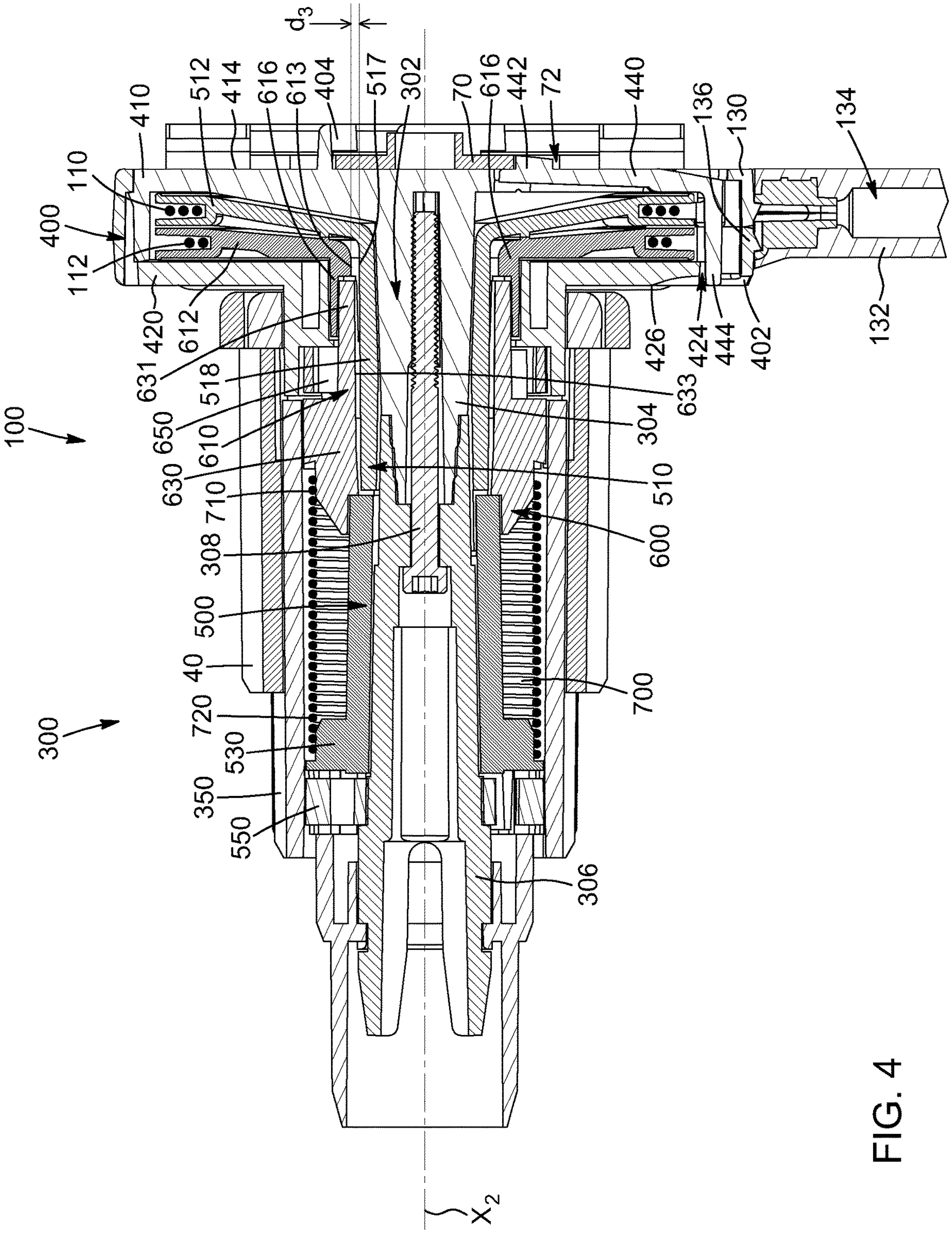
FIG. 4 is a sectional view taken along cross-section lines A-A of the upper portion of the roller blind actuation assembly of FIG. 1.

As best shown in FIGS. 2 to 4, the first driving assembly 510 firstly comprises the spool member 512 (or cable-winding member 512) and an activator 530 (or actuation member 530 or actuation body 530) both defining an actuation shaft-receiving cavity for the first driving assembly 510 to be pivotably mountable onto the actuation shaft 302. As represented in FIG. 4, the spool member 512 is pivotably mounted onto the actuation shaft 302 and extends between the proximal housing member 410 and the activator 530. The spool member 512 and the activator 530 are both rotatable about the actuation axis X2. The spool member 512 comprises a cable-winding portion 514 (or proximal portion 514, with regards to the proximal housing member 410). The cable-winding portion 514 has a substantially cylindrical shape. The spool member 512 further comprises a cable-anchoring portion 516 engageable with the spool-mounting end portion of the first roller blind actuation cable 110. In the embodiment shown, the cable-winding portion 514 comprises a peripheral wall extending substantially perpendicular to the actuation axis X2, the cable-anchoring portion comprising for instance a cable-receiving slot formed in the peripheral wall. The spool member 512 further comprises a shaft 518 (or spool shaft) extending along the actuation axis X2 and having, in the embodiment shown, a cross-section smaller than a cross-section of the cable-winding portion 514. Angular couplers 519 are formed at a distal end portion of the shaft 518. The spool member 512 is thus designed to receive a portion of one of the first roller blind actuation cable 110, and more particularly the spool-mounting end portion thereof. The first roller blind actuation cable 110 is thus at least partially wound around the cable-winding portion 514 and is anchored to the cable-anchoring portion 516.

The activator 530 of the first driving assembly 510 comprises an actuation portion 532, for instance at a distal end portion thereof. In the embodiment shown, the actuation portion 532 comprises actuation tabs 534 (two, for instance and without being limitative) extending from a distal face of the activator 530 and having an actuation slope 536 (FIGS. 23 and 24) formed thereon. The activator 530 further comprises a shaft 538 having a substantially cylindrical shape. Angular couplers 539 are formed at a proximal end portion of the shaft 538. The angular couplers 519, 539 of the activator 530 and the cable-winding member 512 are designed to cooperate together for the activator 530 and the cable-winding member 512 to be angularly coupled together upon rotation of the spool member 512 about the actuation axis X2. The actuator 530 further comprises a spring-anchoring portion 537 formed for instance between the actuation portion 532 and the shaft 538.

Figure 23:
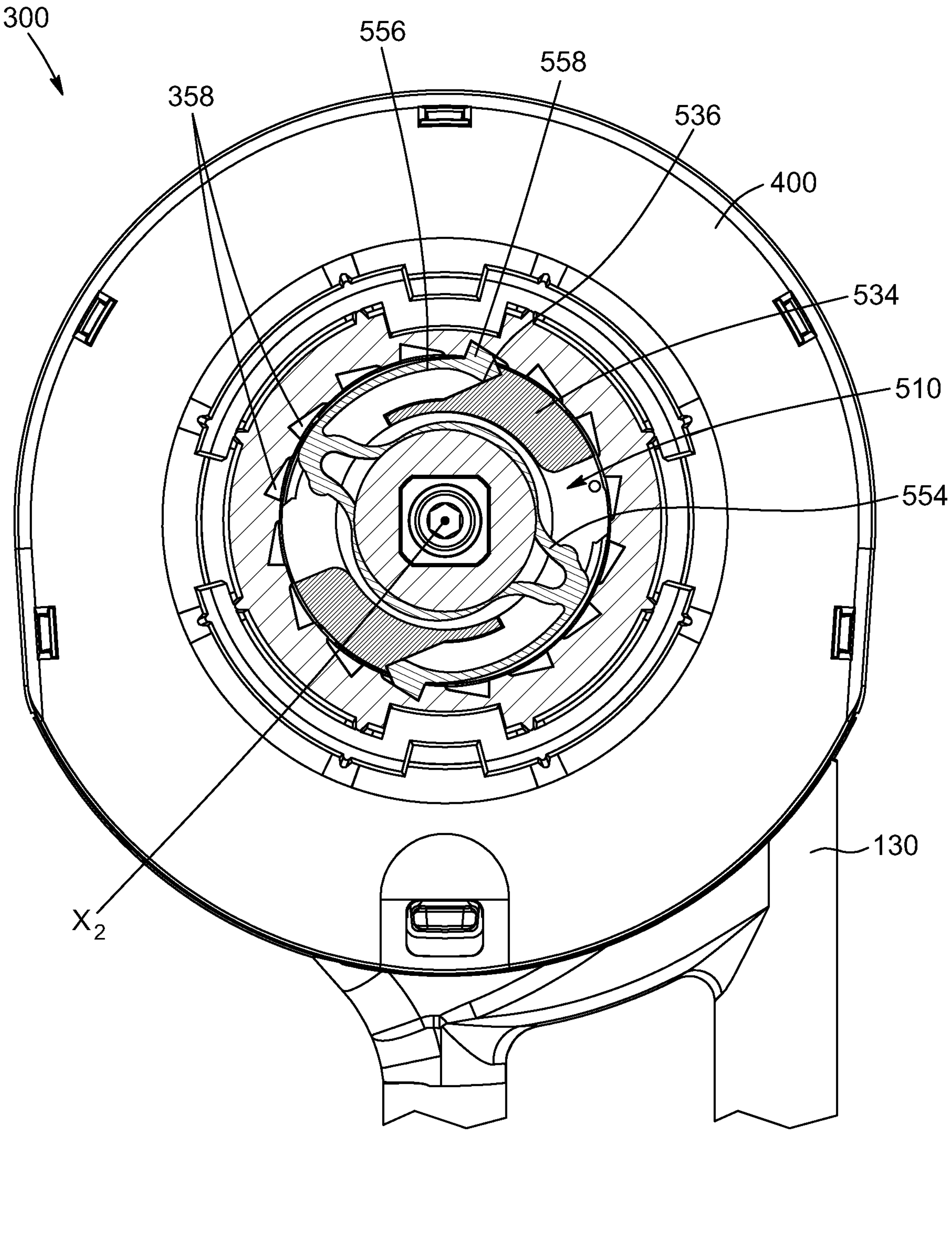
FIGS. 23 and 24 are cross-section views of the cooperation between a first driving assembly and a first blind-engaging member of the roller blind actuation mechanism of FIG. 1, the first blind-engaging member being respectively in an expanded configuration and in a retracted configuration.
Figure 24:
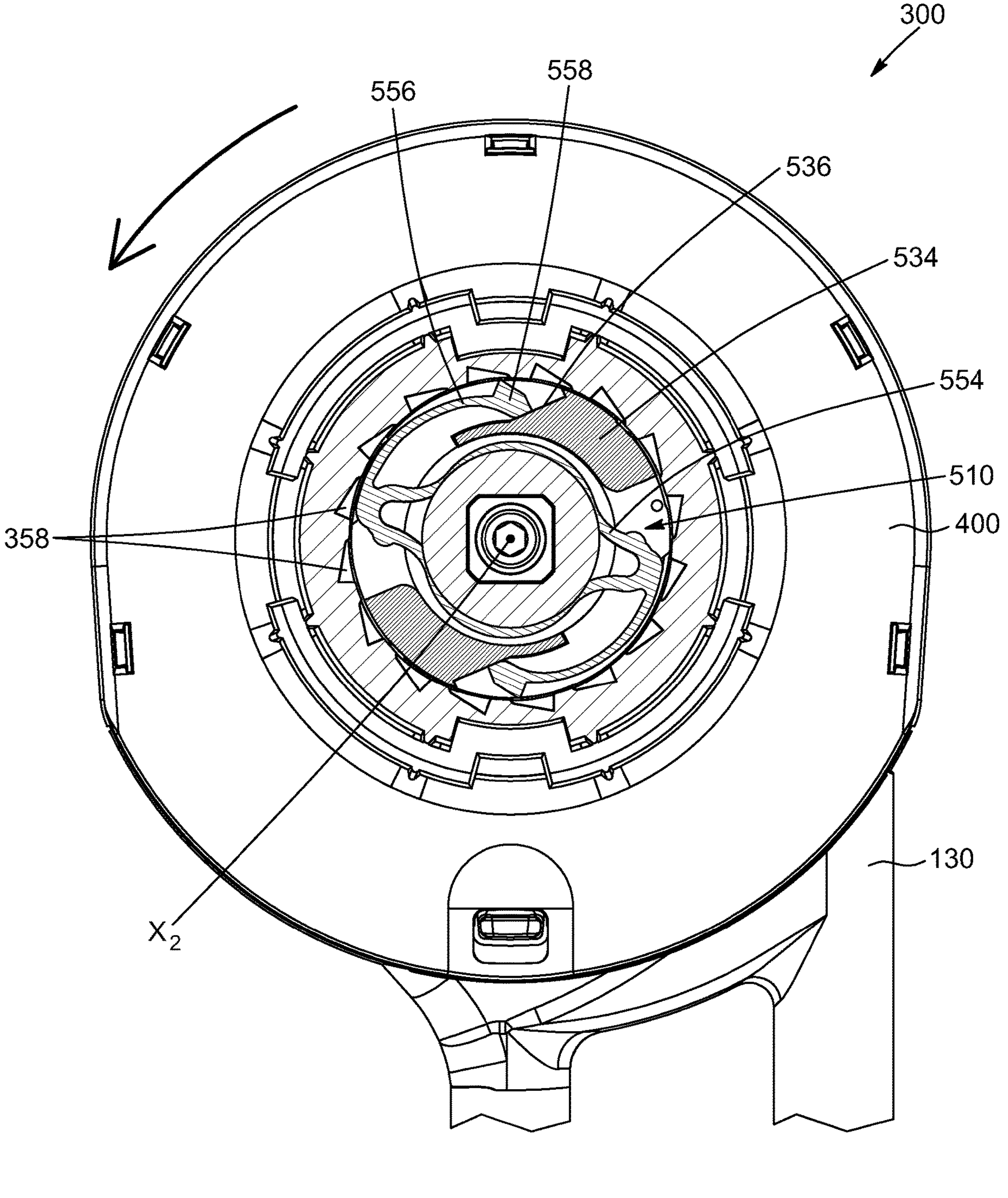

The first driving assembly 510 is configured to cooperate with the first unidirectional angular coupler 550, as represented in FIGS. 23 and 24. The first unidirectional angular coupler 550 has an inner cavity 552 for the first unidirectional angular coupler 550 to be engageable with the actuation shaft 302. The first unidirectional angular coupler 550 comprises flexible mounting portions 554 at least partially delimiting the inner cavity 552. The first unidirectional angular coupler 550 further comprises engagement tongues 556 with engagement protrusions 558 formed at their free ends (two, in the embodiment shown). As represented in FIGS. 23 and 24, the first unidirectional angular coupler 550 is designed for the actuation tabs 534 of the activator 530 to be inserted between the flexible mounting portions 554 and the engagement tongues 556 of the first unidirectional angular coupler 550. The rotation of the activator 530 about the actuation axis X2 in the first direction configures the first unidirectional angular coupler 550 in an expanded configuration (FIG. 23). More particularly, as represented in FIG.

24, when the activator 530 is rotated about the actuation axis X2 in the first direction (in an anti-clockwise direction, in the embodiment shown), the actuation slopes 536 slide against the engagement protrusions 558 of the first unidirectional angular coupler 550 so as to displace outwardly (with regards to the inner cavity 552 of the first unidirectional angular coupler 550) the engagement tongues 556 (i.e. in an outwardly radial direction, with regards to the actuation axis X2). It is understood that the flexible mounting portions 554 are configured to provide an interference fit between the first unidirectional angular coupler 550 and the shaft 538 of the activator 530 with which the first unidirectional angular coupler 550 is engaged. In other words, the flexible mounting portions 554 provide a frictional resistance sufficient for the actuation slopes 536 to slide against the engagement protrusions 558 when the activator 530 is rotated about the actuation axis X2 in the first direction. On the other hand, the frictional resistance provided by the flexible mounting portions 554 does not prevent the first unidirectional angular coupler 550 from rotating about the actuation axis X2 in the first direction, once configured in the expanded configuration, as represented in FIG. 23.

It is appreciated that the shape and the configuration of the first driving assembly 510 comprising the spool member 512 and the activator 530, as well as the shape and the configuration of the first unidirectional angular coupler 550, can vary from the embodiment shown.

Bearing Sleeve

As best shown in FIGS. 2 and 3, the roller blind actuation mechanism 300 further comprises a bearing sleeve 350. The bearing sleeve 350 extends along the actuation axis X2 and comprises a shaft-mounting end portion 352 at a distal end thereof (with regards to spool housing assembly 400) and a bearing body 354 having a substantially cylindrical shape with a shaft-receiving cavity 355 formed therein. The shaft-receiving cavity 355 opens out at a proximal end of the bearing sleeve 350. The bearing sleeve 350 is engageable onto the actuation shaft 302, the shaft-mounting end portion 352 being engageable with the distal end portion 306 of the actuation shaft 302. The bearing sleeve 350 is dimensioned to contain at least partially the first and second driving assemblies 510, 610 and the first and second unidirectional angular couplers 550, 650. The bearing body 354 has an outer surface 357 with angular couplers 356 (or angular coupling protrusions 356) formed thereon and dimensioned to cooperate with corresponding angular couplers formed in an inner surface of the roller blind tube 52, so that when the roller blind actuation assembly 100 is inserted into the mechanism-receiving cavity 54 of the roller blind tube 52, the bearing sleeve 350 and the roller blind tube 52 are angularly coupled to each other upon rotation of the bearing sleeve 350 about the actuation axis X2 in any of the first and second directions. In other words, the bearing sleeve 350 is shaped and dimensioned for the roller blind tube 52 to be rotated about the actuation axis X2 when the bearing sleeve 350 is rotated about the actuation axis X2. For instance, the angular couplers 356 are substantially dovetailed but any other angular couplers could be conceived.

Moreover, the bearing body 354 of the bearing sleeve 350 has an inner surface with angular couplers 358' formed therein—FIG. 3—and dimensioned to cooperate with the engagement protrusions 558 of the first unidirectional angular coupler 550 so that when the first unidirectional angular coupler 550 is configured in the expanded configuration and is rotated about the actuation axis X2 in the first direction, the bearing sleeve 350 and the first unidirectional angular coupler 550 are angularly coupled to each other upon rotation of the first unidirectional angular coupler 550 about the actuation axis X2 in the first direction. In other words, the bearing sleeve 350 and the first unidirectional angular coupler 550 are shaped and dimensioned to be rotated together about the actuation axis X2 in the first direction when the first driving assembly 510 is rotated about the actuation axis X2 in the first direction. It is thus understood that, when a pulling force is exerted on the free end portion 111 of the first roller blind actuation cable 110 (for instance but without being limitative via the first cable-covering tube assembly 200), the spool-mounting end portion being at least partially wound around the spool member 512, the spool member 512 is rotated about the actuation axis X2 in the first direction. The activator 530 is thus also rotated about the actuation axis X2 in the first direction, due to the angular couplers 539, 519. The activator 530 thus cooperates with the first unidirectional angular coupler 550 so as to configure the first unidirectional angular coupler 550 into the expanded configuration, until the engagement protrusions 558 of the first unidirectional angular coupler 550 engage the angular couplers 358' formed on the inner surface of the bearing sleeve 350, thus rotating the bearing sleeve 350, and then the roller blind tube 52 about the actuation axis X2 in the first direction. Thus, the first roller blind actuation cable 110 is selectively couplable to the roller blind tube 52 via the first driving assembly 510, the first unidirectional angular coupler 550 and the bearing sleeve 350.

It is appreciated that the shape and the configuration of the bearing sleeve 350 can vary from the embodiment shown.

Second Driving Assembly—Second Spool Assembly

The second driving assembly 610 has a structure substantially similar to the above-described structure of the first driving assembly 510. The second driving assembly 610 firstly comprises the above-mentioned spool member 612 and an activator 630 both defining a shaft-receiving cavity. The spool member 612 comprises a spool shaft 616 (or distal end portion 616). The spool shaft 616 and the activator 630 are pivotably mountable into a spool-receiving cavity 425 (or shaft-receiving cavity 425) formed in the distal housing member 420 of the spool housing assembly 400. The spool-receiving cavity 425 is substantially cylindrical in the embodiment shown and coaxial with the actuation axis X2. The spool-receiving cavity 425 is shaped and dimensioned to receive at least partially the spool shaft 616 and the activator 630 while the spool shaft 616 and the activator 630 at least partially surround (without any direct contact therewith) the actuation shaft 302. Moreover, the activator 630 has an inner surface 633 at least partially delimiting a shaft-receiving cavity of the activator 630. The shaft-receiving cavity of the activator 630 is shaped and dimensioned so that the inner surface 633 forms a bearing surface between the activator 630 and the activator shaft 538 of the activator 530 of the first driving assembly 510. In the embodiment shown, the cable-winding member 612 is pivotably mounted onto the shaft 302 and extends between the proximal housing member 410 and the activator 630. In the embodiment shown, the spool member 612 and the activator 630 are both arranged, considered along the actuation axis X2, between the spool member 512 and the activator 530 of the first driving assembly 510. The cable-winding member 612 and the actuation member 630 are both rotatable about the actuation axis X2. The cable-winding member 612 comprises a cable-winding portion 614 (or proximal portion 614, with regards to the proximal housing member 410). The cable-winding portion 614 has a substantially cylindrical shape. The cable-winding member 612 further comprises a cable-anchoring portion engageable with the spool-mounting end portion of the second roller blind actuation cable 112. In the embodiment shown, the cable-winding portion 614 comprises a peripheral wall extending substantially perpendicular to the actuation axis X2, the cable-anchoring portion comprising for instance a cable-receiving slot formed in the peripheral wall. Angular couplers 619 are formed at the spool shaft 616 of the cable-winding member 612. The inner cavity of the cable-winding member 612 is shaped and sized for the cable-winding member 612 to surround the shaft 518 of the spool member 512 of the first driving assembly 510. In other words, the first and second driving assemblies are shaped and dimensioned for the second spool member 612 (i.e. the cable-winding member of the second driving assembly 610) to at least partially surround the spool shaft 518 of the first driving assembly 510. In the embodiment shown, the first spool shaft 518 (i.e. the shaft of the first spool member 512) and the second spool member 612 are radially spaced apart from each other (i.e. are spaced apart from a distance d3, considered in a direction transversal to the actuation axis X2—FIG. 4). In other words, considered along a direction substantially perpendicular to the actuation axis X2 (i.e. considered in a radial direction), at least at the cable-winding portions thereof, the first and second driving assemblies 510, 610 do not contact each other. In yet other words, as represented for instance in FIG. 4, considered in a direction substantially perpendicular to the actuation axis X2, an inner surface 613 of the second spool member 612 at least partially delimiting the inner cavity thereof is spaced apart from an outer surface 517 of the shaft 518 of the first spool member 512. In the embodiment shown, the first and second roller blind operating systems 500, 600 are shaped and dimensioned so that a portion of the second actuation member 630 (a portion of a substantially tubular portion 631 thereof, in the embodiment shown) is sandwiched between the distal end portion 616 of the second spool member 612 and the first spool shaft 518 (i.e. extends between the distal end portion 616 of the second spool member 612 and the first spool shaft 518, considered along a radial direction).

Figure 25:
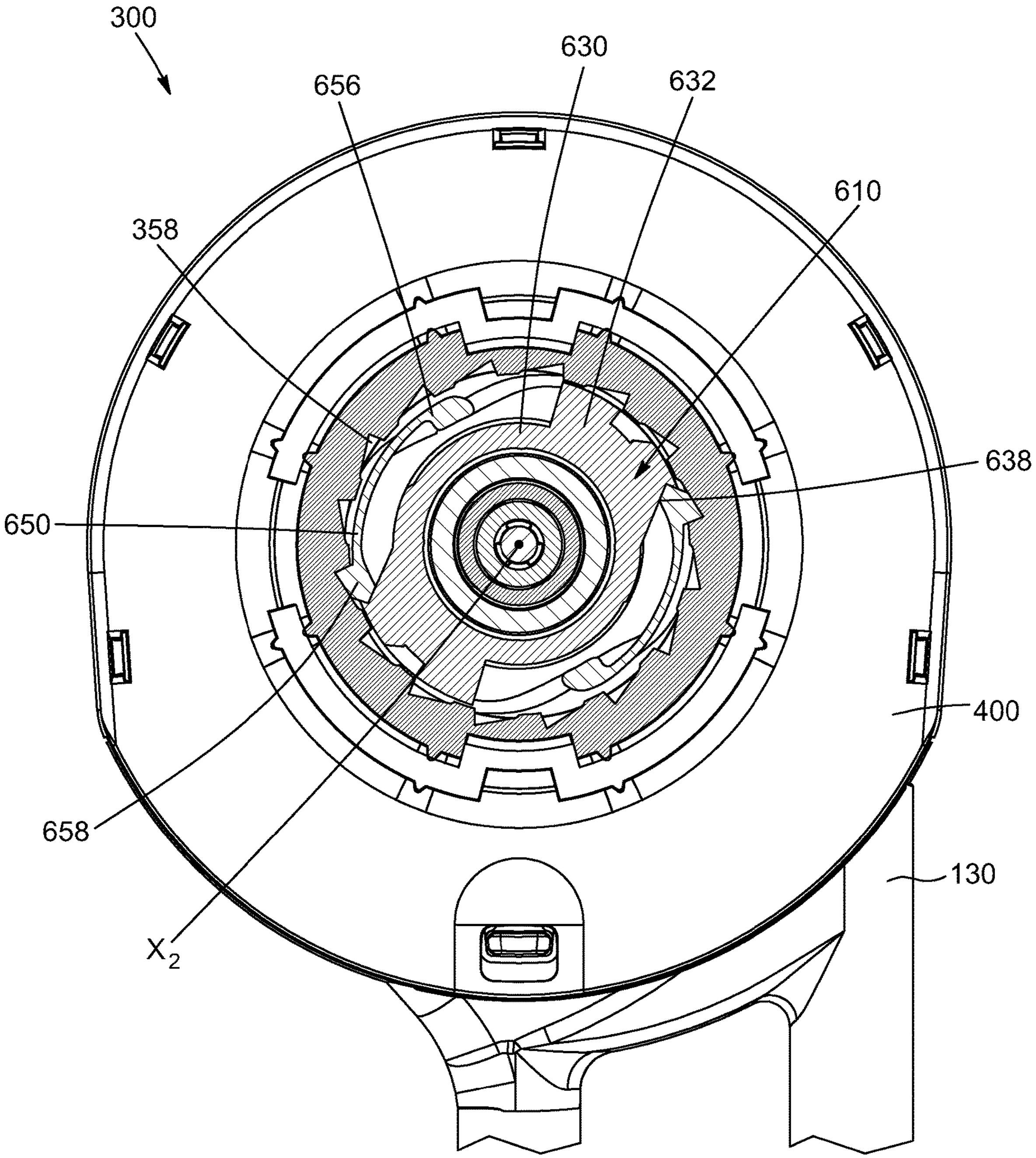
FIGS. 25 and 26 are cross-section views of the cooperation between a second driving assembly and a second blind-engaging member of the roller blind actuation mechanism of FIG. 1, the second blind-engaging member being respectively in the expanded configuration and in the retracted configuration.
Figure 26:
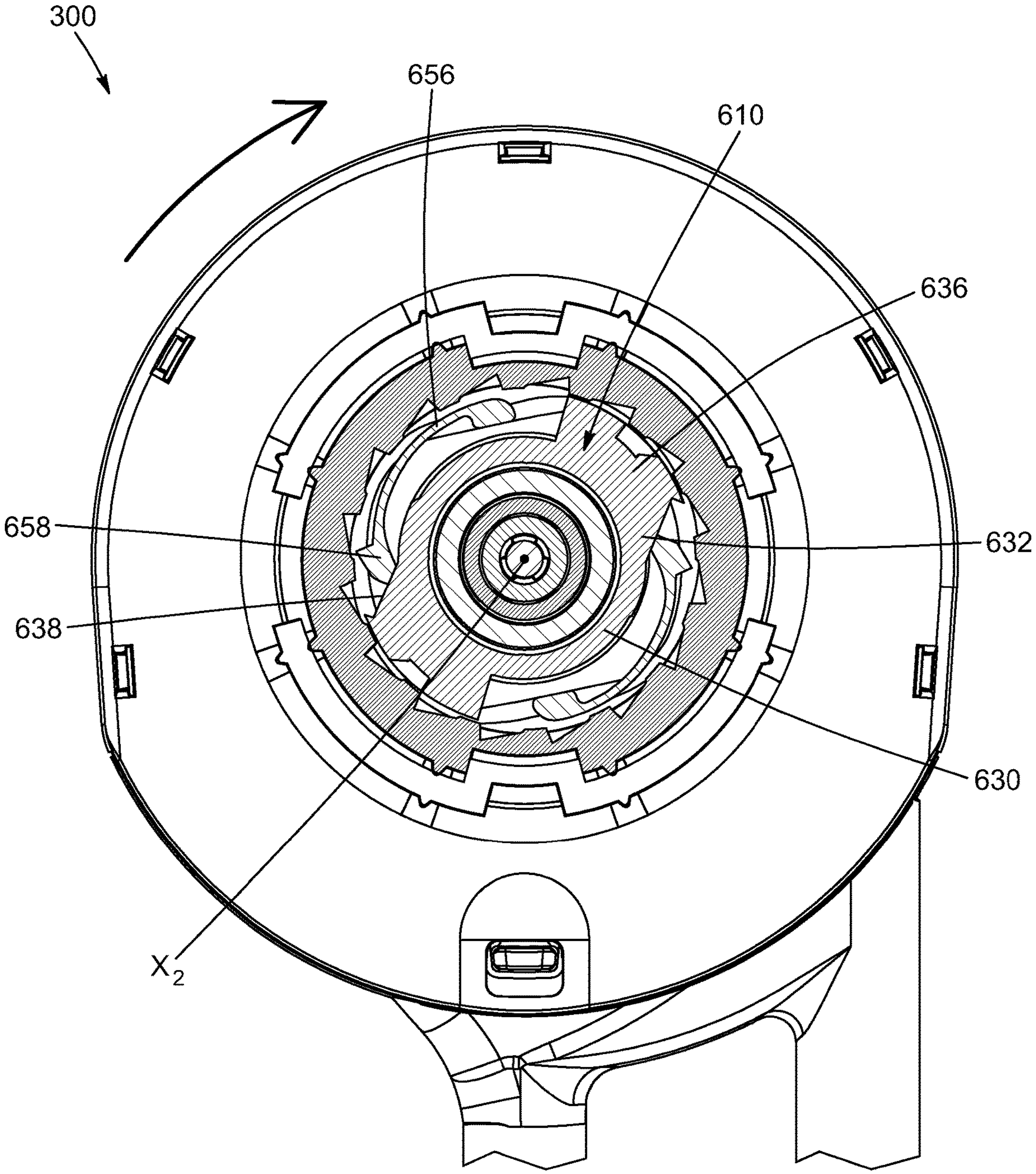

The spool member 612 is thus designed to receive a portion of the second roller blind actuation cable 112, and more particularly the spool-mounting end portion thereof. The second roller blind actuation cable 112 is thus at least partially wound around the cable-winding portion 614 and is anchored to the cable-anchoring portion thereof. As best shown in FIGS. 25 and 26, the activator 630 comprises an actuation portion 632 comprising, in the embodiment shown, actuation tabs 636 (two, for instance and without being limitative) extending radially from a peripheral wall of the activator 630 and having an actuation slope 638 formed thereon. Angular couplers 639 (FIGS. 2 and 3) are formed at a proximal end portion of the activator 630. The angular couplers 619, 639 of the cable-winding member 612 and the actuation member 630 are designed to cooperate together for the cable-winding member 612 and the actuation member 630 to be angularly coupled together upon rotation of the cable-winding member 612 about the actuation axis X2 in the second direction. The actuation member 630 further comprises a spring-anchoring portion 637. The second driving assembly 610 is configured to cooperate with the second blind-engaging member 650 (or unidirectional angular coupler 650), as represented in FIGS. 25 and 26. The second unidirectional angular coupler 650 has an inner cavity 652 at least partially delimited by flexible mounting portions 654. The second unidirectional angular coupler 650 is shaped and dimensioned for the flexible mounting portions 654 to be pivotably mountable onto an inner surface delimiting the spool-receiving cavity 425 formed in the distal housing member 420, between the spool member 512 and the actuation member 630 of the second roller blind operating system 600. The second unidirectional angular coupler 650 further comprises engagement tongues 656 with engagement protrusions 658 formed at their free ends (two, in the embodiment shown). In the embodiment shown, the engagement tongues 656 are axially offset with regards to the flexible mounting portions 654. The second unidirectional angular coupler 650 is designed for the actuation tabs of the actuation member 630 to be inserted at least partially inwardly with regards to the engagement tongues 656. Moreover, the first and second unidirectional angular couplers 550, 650 are shaped and dimensioned so that the force couple between the flexible mounting portions 654 and the inner cavity 552 is radially inverted with regards to the force couple between the engagement tongues 556, 656 of the first and second unidirectional angular couplers 550, 650. The rotation of the actuation member 630 about the actuation axis X2 in the second direction configures the second unidirectional angular coupler 650 in an expanded configuration (FIG. 25). More particularly, as represented in FIG. 26, when the actuation member 630 is rotated about the actuation axis X2 in the second direction (in a clockwise direction, in the embodiment shown), the actuation slopes 638 slide against the engagement protrusions 658 of the second unidirectional angular coupler 650 so as to displace outwardly (with regards to the inner cavity of the second unidirectional angular coupler 650) the engagement tongues 656 (i.e. in an outwardly radial direction, with regards to the actuation axis X2).

It is appreciated that the shape and the configuration of the second driving assembly 610 comprising the spool member 612 and the actuation member 630, as well as the shape and the configuration of the unidirectional angular coupler 650, can vary from the embodiment shown.

Similarly to the first roller blind operating system 500, when a pulling force is exerted on the free end portion 113 of the second roller blind actuation cable 112 (for instance but without being limitative via the cable-covering tube assembly), the second roller blind actuation cable being at least partially wound around the cable-winding member 612, the cable-winding member 612 is rotated about the actuation axis X2 in the second direction. The actuation member 630 is thus also rotated about the actuation axis X2 in the second direction, due to the angular couplers 619, 639. The actuation member 630 thus cooperates with the second blind-engaging member 630 so as to configure the second blind-engaging member 630 in the expanded configuration, until the engagement protrusions 658 of the second blind-engaging member 630 engage angular couplers 358—FIG. 2—formed on the inner surface of the bearing sleeve 350, thus rotating the bearing sleeve 350, and then the roller blind tube 52, about the actuation axis X2 in the second direction. In the embodiment shown, the angular couplers 358', 358 formed in the inner surface of the bearing sleeve 350 and configured to cooperate respectively with the first and second unidirectional angular couplers 550, 650 are axially spaced apart from each other, considered along the actuation axis X2.

Biasing Member (Torsion Spring)

In the embodiment shown, the roller blind actuation mechanism 300 further comprises a biasing member 700 (or torsion spring 700, or a helical torsion spring 700 in the embodiment shown) configured to store energy when the roller blind actuation mechanism 300 is actuated (i.e. when any of the first and second driving assemblies 510, 610 is rotated about the actuation axis X2, for instance by exerting a pulling force on the corresponding one of the first and second roller blind actuation cables 110, 112). The torsion spring 700 is configured to ease the rotation of the first and second driving assemblies 510, 610 in a reverse direction (i.e. in a clockwise direction for the first driving assembly 510 and in an anti-clockwise direction for the second driving assembly 610) when the pulling force ceases. In other words, the biasing member 700 is shaped and dimensioned to store a sufficient energy to ensure an adequate winding of the roller blind actuation cables 110, 112 onto the corresponding one of the first and second spool members 512, 612 as well as to allow the configuration of the cable-covering tube assemblies 200 into the retracted configuration once the user stops actuating the corresponding one of the cable-covering tube assemblies 200.

As best shown in FIG. 4, the helical torsion spring 700 extends along the actuation axis X2 and surrounds at least partially the shaft 302 (at least partially the distal shaft portion 306 thereof, in the embodiment shown). The torsion spring 700 comprises a proximal end portion 710 engaged with the actuation member 630 of the second driving assembly 610 (with the spring-anchoring portion 637 thereof, in the embodiment shown) and a distal end portion 720 engaged with the actuation member 530 of the first driving assembly 510 (with the spring-anchoring portion 537 thereof, in the embodiment shown). In the embodiment shown, the torsion spring 700 extends between the first and second unidirectional angular couplers 550, 650 and is spaced apart from any one of the first and second spool members 512, 612. It is thus understood that when any of the first and second driving assemblies 510, 610 is rotated about the actuation axis X2 in the corresponding one of the first and second directions, the torsion spring 700 is tensed or loaded and stores energy. Reversely, when no more pulling force is exerted on any of the first and second roller blind actuation cables 110, 112, the torsion spring 700 extends and releases the stored energy. It is thus understood that, by being engaged with the first and second actuation members 530, 630, the torsion spring 700 operatively couples the first and second roller blind operating systems 500, 600 (and more particularly the first and second driving assemblies thereof). It is understood that the helical torsion spring 700 can be preloaded prior to the installation of the roller blind actuation assembly 100 in the mechanism-receiving cavity 54 of the roller blind tube 52. To this end, the first actuation member 530 is axially—considered along the actuation axis X2—separated from the first spool member 512, and the first actuation member 530 with the distal end portion 720 of the helical torsion spring 700 engaged therewith, is pivoted about the actuation axis X2. Once the desired preloading tension has been reached, the first actuation member 530 is axially displaced towards the first spool member 512 for the first actuation member 530 and the first spool member 512 to be angularly coupled to each other. In the embodiment shown, the outer cross-section of the tube connector 220 is greater than the inner diameter of the tube-receiving cavity 134 of the actuation mechanism-mounting sleeve 132 for an upper portion of the first cable-covering tube and/or the upper end portion of the cable extension 240 to be prevented from being displaced in the tube-receiving cavity 134 of the actuation mechanism-mounting sleeve 132. In other words, the tube connectors 220 of the above-described cable-covering tube assembly 200 makes it possible to maintain the desired preloading tension. It is appreciated that the shape, the configuration, and the location of the torsion spring 700 in particular with regards to the first and second roller blind operating systems 500, 600 can vary from the embodiment shown. It is understood that the roller blind actuation assembly 100 is not limited to a helical torsion spring 700 but a roller blind actuation assembly comprising any other type of spring or biasing member could be conceived.

As best shown in FIG. 4, the actuation rod assemblies 200 covering at least partially the first and second roller blind actuation cables 110, 112 are substantially aligned, considered along the actuation axis X2, with the corresponding one of the first and second spool members 512, 612. Moreover, it is understood that the torsion spring 700 is spaced apart from any of the first and second spool members 512, 612. In the embodiment shown, the actuation member 630 and the blind-engaging member 650 of the second roller blind operating system 600 are arranged between the proximal end portion 710 of the torsion spring 700 and the first and second spool members 512, 612. Upon actuation of the roller blind actuation assembly 100, the torsion spring 700 is thus prevented from creating frictional forces with any of the first and second spool members 512, 612. Due to the specific arrangement of the first and second driving roller blind operating systems 500, 600 and the torsion spring 700, the frictional forces between the first and second driving assemblies 510, 610 are limited upon actuation of any one of the first and second roller blind actuation cables 110, 112. In other words, the frictional forces are substantially identical whether the roller blind actuation assembly 100 is actuated to wind or to unwind the blind 56. This feature is in particular allowed by the fact that the first spool shaft and the second spool member are radially spaced apart from each other (i.e. the fact that the first and second driving assemblies have distinct bearing surfaces), so that frictional forces are not added to the second driving assembly by the first driving assembly via the torsion spring.

In the embodiment shown, as best represented in FIGS. 2 and 3, the roller blind actuation assembly 100 further comprises a support-mounting sleeve 40 having for instance a substantially cylindrical shape. The support-mounting sleeve 40 has a bearing sleeve-receiving cavity formed therein that is shaped and dimensioned to receive at least partially the bearing sleeve 350. It is thus understood that the support-mounting sleeve 40 is shaped and dimensioned to form an interface, considered in a radial direction (i.e. substantially perpendicularly to the actuation axis X2) between the bearing sleeve 350 and the roller blind tube 52 (and thus an interface between the roller blind tube 52 and the roller blind actuation mechanism 300). The support-mounting sleeve 40 thus makes it possible to use the roller blind actuation assembly 100 with roller blind tubes having mechanism-receiving cavities of different dimensioned. The support-mounting sleeve 40 thus comprises outer angular couplers 42 and inner angular couplers formed on outer and inner surfaces thereof and configured to cooperate respectively with the angular couplers formed on the inner surface of the roller blind tube 52 and the angular couplers 356 formed on the outer surface of the bearing sleeve 350.

Figure 27:
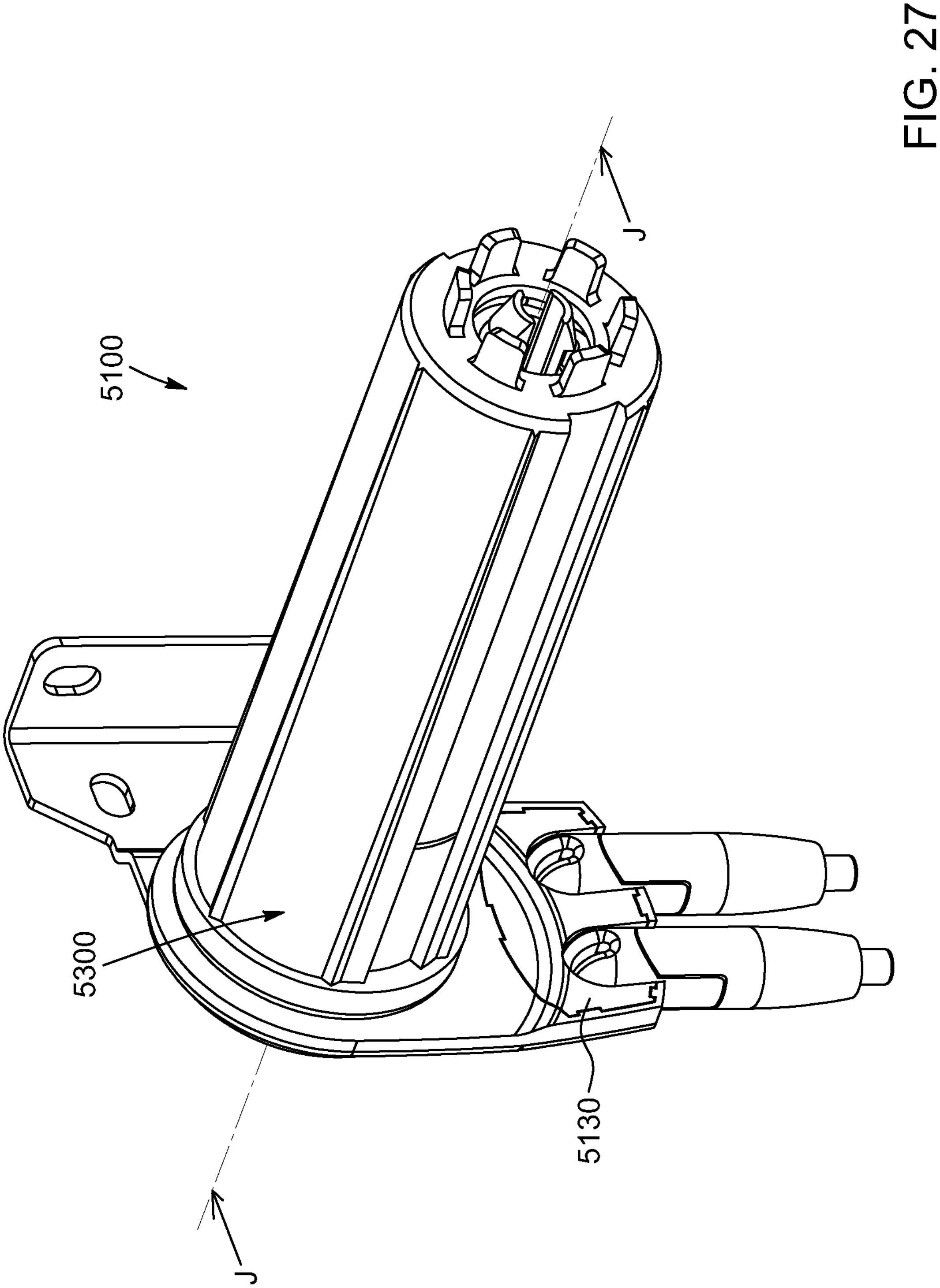
FIG. 27 is a perspective view of roller blind actuation assembly in accordance with another embodiment.
Figure 28:
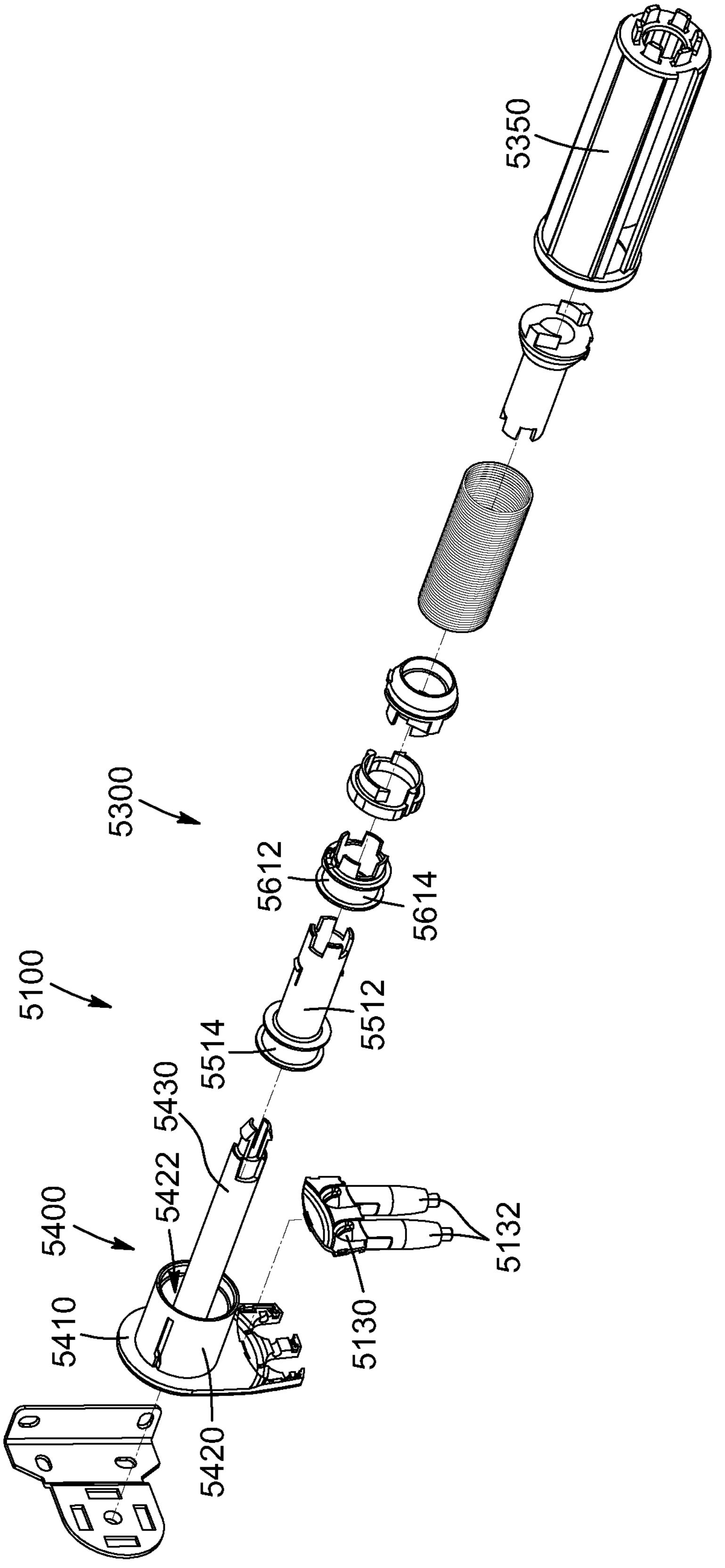
FIG. 28 is an exploded view of the roller blind actuation assembly of FIG. 27.
Figure 29:
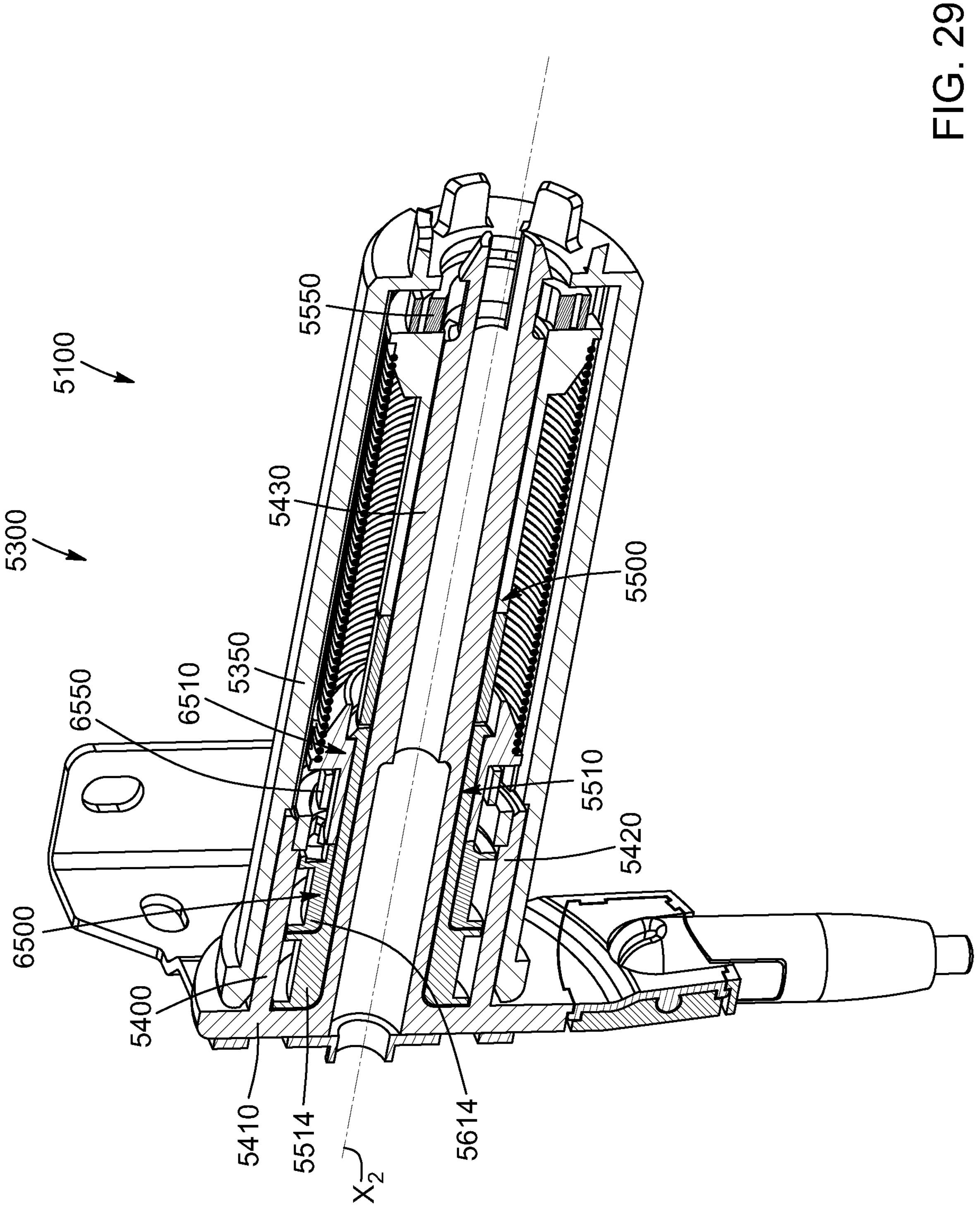
FIG. 29 is a sectional view taken along cross-section lines J-J of the roller blind actuation assembly of FIG. 27.

It is appreciated that the support-mounting sleeve 40 is optional and that the shape and the configuration of the support-mounting sleeve 40 can vary from the embodiment shown. It is appreciated that the shape, the configuration, and the structure of the roller blind actuation assembly 100 can vary from the embodiment shown. For instance, referring now to FIGS. 27 to 29, there is shown another possible embodiment of the roller blind actuation assembly 5100. The roller blind actuation assembly 5100 comprises first and second roller blind operating systems 5500, 5600 and a bearing sleeve 5350. The roller blind actuation assembly 5100 further comprises a spool housing assembly 5400 comprising a bracket-mounting member 5410, a spool-receiving sleeve 5420 substantially cylindrical defining a spool-receiving cavity 5422 and an actuation shaft 5430 extending from an inner face of the bracket-mounting member 5410 at least partially within the spool-receiving cavity 5422. The actuation mechanism-mounting assembly 5130 is engageable with a lower portion of the spool housing assembly 5400 (with a lower portion of the bracket-mounting member 5410 thereof, in the embodiment shown).

The spool housing 5400 is shaped and dimensioned to at least partially contain the first and second spool members 5512, 5612 (to at least partially contain the cable-winding portions 5514, 5614 thereof, in the embodiment shown) so that the first and second spool members 5512, 5612 are at least partially covered by the roller blind tube 52 when the roller blind actuation assembly 5100 is engaged in the mechanism-receiving cavity 54 thereof. In the embodiment shown, the first and second cable-winding portions 5514, 5614 are thus axially offset (considered along the actuation axis X2) with respect to the first and second cable-covering tube assemblies (not represented) engaged with the actuation mechanism-mounting portions 5132 of the actuation mechanism-mounting assembly 5130. In the embodiment shown, the actuation mechanism-mounting portions 5132 of the actuation mechanism-mounting assembly 5130 comprise a universal joint—or ball joint—that is shaped and dimensioned to flexibly secure an upper end portion of the cable-covering tube assembly (not represented) to the roller blind actuation mechanism 5300 and/or the spool housing assembly 5400 of the roller blind actuation assembly 5100. Cable-guiding paths might be formed in the spool housing assembly 5400 (for instance in the spool-receiving sleeve 5420 thereof) that could extend substantially parallel to the actuation axis X2. It is understood that the roller blind actuation assembly 5100 is designed so that the spool-mounting end portions of the first and second roller blind actuation cables (not represented) are at least partially wound in the inner cavity of the bearing sleeve 5350 (and thus in the inner cavity of the roller blind tube 52).

Even though the disclosed embodiments comprise first and second cable-covering tube assemblies designed respectively to wind and unwind the roller blind upon actuation of the first and second driving assemblies, a roller blind actuation assembly having only one cable-covering tube assembly—to wind and/or unwind the roller blind—could also be conceived. Similarly, even though the disclosed embodiments comprise first and second driving assemblies designed respectively to wind and unwind the roller blind upon rotation of the first and second driving assemblies about the actuation axis, a roller blind actuation assembly having only one driving assembly—to wind or unwind the roller blind—could also be conceived. Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind. The scope of the invention is therefore intended to be limited by the scope of the appended claims.

What is claimed is:

1. A cable-covering tube assembly for a roller blind actuation cable of a roller blind actuation assembly, the roller blind actuation cable being couplable to a roller blind tube and comprising a free end portion, the cable-covering tube assembly comprising:

- a first cable-covering tube defining a cable-receiving cavity; and
- at least one tube connector extending at least partially in the cable-receiving cavity and comprising:
  - a cable-mounting portion couplable to the free end portion of the roller blind actuation cable; and
  - a coupling portion couplable to the coupling portion of a similar tube connector.

2. The cable-covering tube assembly according to claim 1, wherein the coupling portion comprises a male coupler and a female coupler couplable respectively with the female coupler and the male coupler of a similar tube connector.

3. The cable-covering tube assembly according to claim 1 wherein the first cable-covering tube comprises an end portion, said at least one tube connector being arranged at the end portion of the first cable-covering tube and wherein the cable-mounting portion extends at least partially in the cable-receiving cavity.

4. The cable-covering tube assembly according to claim 1, further comprising an operating handle comprising a handling portion and a tube-coupling portion couplable to the coupling portion of said at least one tube connector.

5. The cable-covering tube assembly according to claim 1, wherein said at least one tube connector comprises upper and lower cable extension tube connectors connected to each other, the cable-mounting portion of the upper cable extension tube connector being couplable to the free end portion of the roller blind actuation cable, the cable-covering tube assembly further comprising a cable extension extending at least partially in the cable-receiving cavity of said first cable-covering tube and being coupled to the cable-mounting portion of the lower cable extension tube connector, wherein said at least one tube connector further comprises a lower tube connector at least partially arranged in the cable-receiving cavity, the cable extension being coupled to the cable-mounting portion of said lower tube connector and extending at least partially in the cable-receiving cavity between the lower cable extension tube connector and the lower tube connector.

6. The cable-covering tube assembly according to claim 1, further comprising a second cable-covering tube slidably engaged with the first cable-covering tube, wherein the first cable-covering tube is outwardly slidable with regards to the second cable-covering tube and wherein the first and second cable-covering tubes form at least partially a telescopic tube assembly.

7. The cable-covering tube assembly according to claim 1, further comprising a tube-supporting bracket securable to a support structure and comprising a tube-receiving portion engageable with the first cable-covering tube, wherein the tube-receiving portion comprises one of a metallic member and a magnetic member, said first cable-covering tube comprising the other one of the metallic member and the magnetic member.

8. A cable-covering tube system for a roller blind actuation assembly comprising a roller blind actuation mechanism couplable to a roller blind tube and at least one roller blind actuation cable coupled to the roller blind actuation mechanism and comprising a free end portion, the roller blind actuation mechanism being actuated upon traction on said at least one roller blind actuation cable, the cable-covering tube system comprising:

a. the cable-covering tube assembly according to claim 1 couplable to the free end portion;

b. an actuation mechanism-mounting assembly engageable with the roller blind actuation mechanism, the actuation mechanism-mounting assembly comprising at least one actuation mechanism-mounting sleeve defining a tube-receiving cavity, said at least one cable-covering tube assembly being at least partially engaged with a corresponding one of said at least one tube-receiving cavity; and c. an actuation mechanism-mounting body engageable with the roller blind actuation mechanism, said at least one actuation mechanism-mounting sleeve extending downwardly from the actuation mechanism-mounting body.

9. The cable-covering tube system according to claim 8, wherein the at least one roller blind actuation cable comprises first and second roller blind actuation cables, said cable-covering tube system comprising first and second cable-covering tube assemblies mountable to the free end portion of a respective one of the first and second roller blind actuation cables, and wherein said at least one actuation mechanism-mounting sleeve comprises first and second actuation mechanism-mounting sleeves engaged respectively with the first and second cable-covering tube assemblies, wherein the actuation mechanism-mounting assembly has a central axis extending substantially vertically when the actuation mechanism-mounting assembly is engaged with the roller blind actuation mechanism, a first distance between the central axis and the first actuation mechanism-mounting sleeve being different from a second distance between the central axis and the second actuation mechanism-mounting sleeve, and wherein the central axis divides the actuation mechanism-mounting assembly into first and second sides, the first and second actuation mechanism-mounting sleeves both extending on the first side.

10. A roller blind actuation assembly comprising:

a. at least one roller blind actuation cable couplable to a roller blind actuation mechanism and comprising a free end portion;

b. the cable-covering tube system according to claim 8, each one of said at least one cable-covering tube assembly being coupled to the free end portion of a respective one of said at least one roller blind actuation cable; and c. a spool housing assembly defining a spool-receiving cavity and having a lower portion, the spool-receiving cavity being shaped and dimensioned to at least partially contain the roller blind actuation mechanism;

d. wherein the actuation mechanism-mounting assembly is engaged with the lower portion of the spool housing assembly.

11. The roller blind actuation assembly according to claim 10, wherein the spool housing assembly comprises:

a. a proximal housing member engageable with a roller blind-supporting bracket; and b. a distal housing member removably couplable to the proximal housing member;

c. the spool-receiving cavity being at least partially delimited between the proximal and distal housing members, wherein the spool housing assembly further comprises a mobile support-mounting member configurable into a mounting configuration wherein the spool housing assembly is engaged with the roller blind-supporting bracket, and into a removal configuration wherein the spool housing assembly is disengaged from the roller blind-supporting bracket, wherein the proximal housing member comprises a bracket-mounting face, the support-mounting member comprising a support-mounting portion protruding from the bracket-mounting face, and an actuation portion displaceable between a locked configuration wherein the support-mounting member is configured into the mounting configuration, and an unlocked configuration wherein the support-mounting member is configured into the removal configuration.

12. The roller blind actuation assembly according to claim 11, wherein an actuator-receiving aperture is formed in the distal housing member, the actuation portion being at least partially engaged with the actuator-receiving aperture and wherein the distal housing member has an outer face, the actuation portion being reachable from the outer face of the distal housing member.

13. A roller blind actuation assembly for a roller blind system comprising a roller blind tube, the roller blind actuation assembly comprising:

a. an actuation shaft having an actuation axis;

b. first and second roller blind actuation cables having each a spool-mounting end portion and a free end portion;

c. a first roller blind-operating system pivotably mounted to the actuation shaft and comprising:

i. a first driving assembly having a first spool member, the spool-mounting end portion of the first roller blind actuation cable being engaged therewith to rotate the first driving assembly about the actuation axis in a first direction when a pulling force is exerted on the free end portion thereof; and ii. a first unidirectional angular coupler selectively couplable to the roller blind tube upon rotation of the first driving assembly about the actuation axis in the first direction;

d. a second roller blind-operating system pivotably mounted to the actuation shaft and comprising:

i. a second driving assembly having a second spool member, the spool-mounting end portion of the second roller blind actuation cable being engaged therewith to rotate the second driving assembly about the actuation axis in a second direction opposed to the first direction when a pulling force is exerted on the free end portion thereof; and ii. a second unidirectional angular coupler selectively couplable to the roller blind tube upon rotation of the second driving assembly about the actuation axis in the second direction; and e. a biasing member operatively coupling the first and second driving assemblies and arranged between first and second unidirectional angular couplers.

14. The roller blind actuation assembly according to claim 13, wherein:

a. the first driving assembly comprises a first actuation member angularly coupled to the first spool member and selectively coupling the first unidirectional angular coupler to the roller blind tube upon rotation of the first driving assembly about the actuation axis in the first direction;

b. the second driving assembly comprises a second actuation member angularly coupled to the second spool member and selectively coupling the second unidirectional angular coupler to the roller blind tube upon rotation of the second driving assembly about the actuation axis in the second direction;

c. wherein the biasing member comprises a torsion spring extending along the actuation axis, the torsion spring comprising a distal end portion and a proximal end portion, the distal end portion being engaged with one of the first and second actuation members and the proximal end portion being engaged with the other one of the first and second actuation members.

15. The roller blind actuation assembly according to claim 13, further comprising a first cable-covering tube assembly at least partially surrounding the first roller blind actuation cable when a pulling force is exerted on the free end portion thereof, wherein considered along the actuation axis, the first cable-covering tube assembly is substantially aligned with the first spool member and a second cable-covering tube assembly at least partially surrounding the second roller blind actuation cable when a pulling force is exerted on the free end portion thereof, wherein considered along the actuation axis, the second cable-covering tube assembly is substantially aligned with the second spool member.

16. The roller blind actuation assembly according to claim 13, further comprising a spool housing assembly engageable with a roller blind-supporting bracket and defining a spool-receiving cavity containing at least partially one of the first and second roller blind-operating systems, wherein the spool housing assembly comprises a proximal housing member engageable with the roller blind-supporting bracket and a distal housing member removably couplable to the proximal housing member, the spool-receiving cavity being at least partially delimited between the proximal and distal housing members and being shaped and dimensioned to contain at least partially the first and second spool members.

17. The roller blind actuation assembly according to claim 16, wherein the proximal housing member has an inner face, the actuation shaft extending from the inner face of the proximal housing member, wherein the spool housing assembly further comprises a mobile support-mounting member configurable into a mounting configuration wherein the spool housing assembly is engaged with the roller blind-supporting bracket, and into a removal configuration wherein the spool housing assembly is disengaged from the roller blind-supporting bracket.

18. A roller blind actuation assembly for a roller blind system comprising a roller blind tube, the roller blind actuation assembly comprising:

a. an actuation shaft having an actuation axis;

b. first and second roller blind actuation cables having each a spool-mounting end portion and a free end portion;

c. a first roller blind-operating system pivotably mounted to the actuation shaft and comprising:

i. a first driving assembly having a first spool member and a first spool shaft at least partially surrounding the actuation shaft, the spool-mounting end portion of the first roller blind actuation cable being engaged with the first spool member to rotate the first driving assembly about the actuation axis in a first direction when a pulling force is exerted on the free end portion thereof; and ii. a first unidirectional angular coupler selectively couplable to the roller blind tube upon rotation of the first driving assembly about the actuation axis in the first direction; and d. a second roller blind-operating system pivotably mounted to the actuation shaft and comprising:

i. a second driving assembly having a second spool member at least partially surrounding the first spool shaft, the spool-mounting end portion of the second roller blind actuation cable being engaged with the second spool member to rotate the second driving assembly about the actuation axis in a second direction opposed to the first direction when a pulling force is exerted on the free end portion thereof; and ii. a second unidirectional angular coupler selectively couplable to the roller blind tube upon rotation of the second driving assembly about the actuation axis in the second direction;

e. wherein the first spool shaft and the second spool member are radially spaced apart from each other.

19. The roller blind actuation assembly according to claim 18, wherein:

a. the first driving assembly comprises a first actuation member angularly coupled to the first spool member and selectively coupling the first unidirectional angular coupler to the roller blind tube upon rotation of the first driving assembly about the actuation axis in the first direction;

b. the second driving assembly comprises a second actuation member angularly coupled to the second spool member and selectively coupling the second unidirectional angular coupler to the roller blind tube upon rotation of the second driving assembly about the actuation axis in the second direction;

c. wherein, considered in a direction perpendicular to the actuation axis, the first actuation member extends at least partially between the first spool member and the second spool member, the roller blind actuation assembly further comprising a torsion spring extending along the actuation axis and operatively coupling the first and second driving assemblies and extending between the first and second unidirectional angular couplers, wherein the biasing member comprises a distal end portion and a proximal end portion, the distal end portion being engaged with one of the first and second actuation members and the proximal end portion being engaged with the other one of the first and second actuation members.

20. The roller blind actuation assembly according to claim 18, further comprising a first cable-covering tube assembly at least partially surrounding the first roller blind actuation cable when a pulling force is exerted on the free end portion thereof, wherein considered along the actuation axis, the first cable-covering tube assembly is substantially aligned with the first spool member and a second cable-covering tube assembly at least partially surrounding the second roller blind actuation cable when a pulling force is exerted on the free end portion thereof, wherein considered along the actuation axis, the second cable-covering tube assembly is substantially aligned with the second spool member.

* * * * *